US011652916B1

(12) United States Patent
Gordon et al.

(10) Patent No.: US 11,652,916 B1
(45) Date of Patent: *May 16, 2023

(54) SCREEN INTERFACE FOR A MOBILE DEVICE APPARATUS

(71) Applicant: W74Technology, LLC, Plano, TX (US)

(72) Inventors: George Andrew Gordon, Fisco, TX (US); Joseph A Cerrato, Longview, TX (US); Ronald A Johnston, Longview, TX (US); Kevin J Zilka, Los Gatos, CA (US)

(73) Assignee: W74 Technology, LLC, Longview, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/180,662

(22) Filed: Feb. 19, 2021

Related U.S. Application Data

(63) Continuation of application No. 16/357,161, filed on Mar. 18, 2019, which is a continuation of application
(Continued)

(51) Int. Cl.
*G06Q 20/00* (2012.01)
*H04M 1/72412* (2021.01)
(Continued)

(52) U.S. Cl.
CPC .... *H04M 1/72412* (2021.01); *G06F 3/04883* (2013.01); *G06F 21/32* (2013.01);
(Continued)

(58) Field of Classification Search
CPC . H04M 1/72412; G06Q 20/409; G06Q 20/40; G06Q 20/327; G06Q 20/326;
(Continued)

(56) References Cited

U.S. PATENT DOCUMENTS 5,797,031 A   8/1998  Shapiro et al.
5,924,042 A   7/1999  Sakamoto et al.
(Continued)

FOREIGN PATENT DOCUMENTS

AU   2014278594 A1   12/2015
CN     101808633 A    8/2010
(Continued)

OTHER PUBLICATIONS

Office Action dated Jan. 3, 2020 for U.S. Appl. No. 16/357,161.
(Continued)

*Primary Examiner* — Dante Ravetti
(74) *Attorney, Agent, or Firm* — Patrick E. Caldwell, Esq.; The Caldwell Firm, LLC

(57) ABSTRACT

In various embodiments, a mobile phone apparatus is provided for: storing, at an electronic device, payment information for a payment account; detecting, at the electronic device, that a mechanical input was locally received at the electronic device; and in response to detecting that the mechanical input has been locally received at the device, enabling, at the electronic device, the payment information to be accessed.

30 Claims, 17 Drawing Sheets

Related U.S. Application Data

No. 15/946,722, filed on Apr. 5, 2018, now Pat. No. 10,250,734, and a continuation of application No. 15/789,867, filed on Oct. 20, 2017, now Pat. No. 10,057,400, which is a continuation-in-part of application No. 14/050,332, filed on Oct. 9, 2013, now abandoned.

(60) Provisional application No. 61/722,122, filed on Nov. 2, 2012.

(51) Int. Cl.
| | |
|---|---|
| *G06F 21/32* | (2013.01) |
| *G06F 21/36* | (2013.01) |
| *G06Q 20/32* | (2012.01) |
| *G06F 3/04883* | (2022.01) |
| *G06Q 20/40* | (2012.01) |

(52) U.S. Cl.
CPC ............ *G06F 21/36* (2013.01); *G06Q 20/32* (2013.01); *G06Q 20/326* (2020.05); *G06Q 20/327* (2013.01); *G06Q 20/3227* (2013.01); *G06Q 20/40* (2013.01); *G06Q 20/409* (2013.01)

(58) Field of Classification Search
CPC ............... G06Q 20/32; G06Q 20/3227; G06F 3/04883; G06F 21/32; G06F 21/36
USPC .......................... 705/16, 21, 59; 380/44, 262
See application file for complete search history.

(56) References Cited

U.S. PATENT DOCUMENTS

| | | | |
|---|---|---|---|
| 6,282,612 B1 | 8/2001 | Sakajiri et al. | |
| 6,703,918 B1 | 3/2004 | Kita | |
| 6,868,074 B1 | 3/2005 | Hanson | |
| 6,974,078 B1 | 12/2005 | Simon | |
| 6,985,078 B2 | 1/2006 | Suzuki et al. | |
| 7,254,786 B2 | 8/2007 | Henriquez | |
| 7,641,111 B2 | 1/2010 | Adams et al. | |
| 7,900,833 B2 | 3/2011 | Silverbrook et al. | |
| 7,946,477 B1 | 5/2011 | Ramachandran et al. | |
| 8,023,895 B2 | 9/2011 | Smith | |
| 8,065,235 B2 | 11/2011 | Narayanaswami et al. | |
| 8,113,438 B1 | 2/2012 | Leason et al. | |
| 8,126,806 B1 | 2/2012 | DiMartino et al. | |
| 8,196,131 B1 | 6/2012 | Behren et al. | |
| 8,223,024 B1 | 7/2012 | Petrou | |
| 8,291,349 B1 | 10/2012 | Park et al. | |
| 8,335,932 B2 | 12/2012 | Behren et al. | |
| 8,346,672 B1 | 1/2013 | Weiner et al. | |
| 8,370,431 B1 | 2/2013 | Wang et al. | |
| 8,380,177 B2 | 2/2013 | Laracey | |
| 8,417,225 B2 | 4/2013 | Mock et al. | |
| 8,577,803 B2 | 11/2013 | Chatterjee et al. | |
| 8,649,770 B1 | 2/2014 | Cope et al. | |
| 8,666,895 B2 | 3/2014 | Grigg et al. | |
| 9,129,273 B2 | 9/2015 | Baldwin et al. | |
| 9,299,072 B2 | 3/2016 | Khan et al. | |
| 9,400,977 B2 | 7/2016 | Brown et al. | |
| 9,483,758 B2 | 11/2016 | Rhee et al. | |
| 9,519,901 B1 | 12/2016 | Dorogusker | |
| 9,529,490 B2 | 12/2016 | Li | |
| 9,830,589 B2 | 11/2017 | Xing | |
| 9,864,984 B2 | 1/2018 | Khan et al. | |
| 10,120,541 B2 | 11/2018 | Shaw et al. | |
| 10,223,682 B2 | 3/2019 | Brown et al. | |
| 10,311,503 B2 | 6/2019 | Lim et al. | |
| 10,379,830 B2 | 8/2019 | Prasad et al. | |
| 10,489,769 B2 | 11/2019 | Brown et al. | |
| 10,551,876 B2 | 2/2020 | Sepulveda et al. | |
| 10,635,134 B2 | 4/2020 | Sepulveda et al. | |
| 10,642,416 B2 | 5/2020 | Sepulveda et al. | |
| 10,699,262 B2 | 6/2020 | Brown et al. | |
| 10,754,603 B2 | 8/2020 | Bernstein et al. | |
| 10,861,090 B2 | 12/2020 | Haggerty et al. | |
| 11,017,458 B2 | 5/2021 | Lim et al. | |
| 2002/0169673 A1 | 11/2002 | Prorock et al. | |
| 2003/0001722 A1 | 1/2003 | Smith | |
| 2003/0028481 A1 | 2/2003 | Flitcroft et al. | |
| 2003/0108009 A1 | 6/2003 | Petersen | |
| 2004/0054629 A1 | 3/2004 | Jong et al. | |
| 2004/0225613 A1 | 11/2004 | Narayanaswami et al. | |
| 2005/0074125 A1 | 4/2005 | Chavanne et al. | |
| 2005/0221798 A1 | 10/2005 | Sengupta et al. | |
| 2006/0131390 A1* | 6/2006 | Kim ...................... G06Q 40/00 235/380 |
| 2006/0135142 A1 | 6/2006 | Repka | |
| 2006/0189382 A1 | 8/2006 | Muir et al. | |
| 2006/0224989 A1 | 10/2006 | Pettiross et al. | |
| 2006/0288233 A1 | 12/2006 | Kozlay | |
| 2007/0035513 A1 | 2/2007 | Sherrard et al. | |
| 2007/0050618 A1 | 3/2007 | Roux et al. | |
| 2007/0152035 A1 | 7/2007 | Adams et al. | |
| 2007/0157094 A1 | 7/2007 | Lemay et al. | |
| 2007/0162350 A1 | 7/2007 | Friedman | |
| 2007/0206743 A1 | 9/2007 | Chang | |
| 2008/0011833 A1 | 1/2008 | Saarisalo | |
| 2008/0045806 A1 | 2/2008 | Keppler | |
| 2008/0165210 A1 | 7/2008 | Platzer et al. | |
| 2008/0235144 A1 | 9/2008 | Phillips | |
| 2009/0007014 A1 | 1/2009 | Coomer et al. | |
| 2009/0159678 A1 | 6/2009 | Day et al. | |
| 2009/0182630 A1 | 7/2009 | Otto et al. | |
| 2009/0212902 A1 | 8/2009 | Haddock | |
| 2009/0300649 A1 | 12/2009 | Gopal et al. | |
| 2010/0023449 A1* | 1/2010 | Skowronek ............ G06Q 20/32 705/39 |
| 2011/0117898 A1 | 5/2011 | Pereira et al. | |
| 2011/0163969 A1 | 7/2011 | Anzures et al. | |
| 2011/0165896 A1 | 7/2011 | Stromberg et al. | |
| 2011/0202834 A1 | 8/2011 | Mandryk et al. | |
| 2011/0214158 A1 | 9/2011 | Pasquero et al. | |
| 2011/0239304 A1 | 9/2011 | Saarisalo | |
| 2011/0264586 A1 | 10/2011 | Boone et al. | |
| 2012/0011572 A1 | 1/2012 | Chew et al. | |
| 2012/0015629 A1 | 1/2012 | Olsen et al. | |
| 2012/0017084 A1 | 1/2012 | Hutton | |
| 2012/0024947 A1 | 2/2012 | Naelon | |
| 2012/0030043 A1 | 2/2012 | Ross et al. | |
| 2012/0030566 A1 | 2/2012 | Victor | |
| 2012/0041767 A1 | 2/2012 | Hoffman et al. | |
| 2012/0095852 A1* | 4/2012 | Bauer ................ G06Q 20/3223 705/16 |
| 2012/0143706 A1 | 6/2012 | Crake et al. | |
| 2012/0206335 A1 | 8/2012 | Osterhout et al. | |
| 2012/0221421 A1 | 8/2012 | Hammad | |
| 2012/0240041 A1 | 9/2012 | Lim et al. | |
| 2012/0241524 A1 | 9/2012 | Blot et al. | |
| 2012/0244805 A1 | 9/2012 | Haikonen et al. | |
| 2012/0254290 A1 | 10/2012 | Naaman | |
| 2012/0266220 A1 | 10/2012 | Brudnicki et al. | |
| 2012/0300932 A1 | 11/2012 | Cambridge et al. | |
| 2012/0310743 A1 | 12/2012 | Johri | |
| 2013/0036382 A1 | 2/2013 | Yuan et al. | |
| 2013/0047123 A1 | 2/2013 | May et al. | |
| 2013/0060618 A1 | 3/2013 | Barton et al. | |
| 2013/0069985 A1 | 3/2013 | Wong et al. | |
| 2013/0073448 A1 | 3/2013 | Wall et al. | |
| 2013/0073449 A1 | 3/2013 | Voynow et al. | |
| 2013/0111599 A1 | 5/2013 | Gargiulo | |
| 2013/0117365 A1 | 5/2013 | Padmanabhan et al. | |
| 2013/0125020 A1 | 5/2013 | Lee et al. | |
| 2013/0151140 A1 | 6/2013 | Suh | |
| 2013/0151400 A1 | 6/2013 | Makhotin et al. | |
| 2013/0173477 A1 | 7/2013 | Cairns | |
| 2013/0189953 A1 | 7/2013 | Mathews | |
| 2013/0212470 A1 | 8/2013 | Karunamuni et al. | |
| 2013/0219342 A1 | 8/2013 | Nosou et al. | |
| 2013/0268331 A1 | 10/2013 | Bitz et al. | |
| 2013/0275883 A1 | 10/2013 | Bharshankar et al. | |
| 2013/0332297 A1 | 12/2013 | Forutanpour et al. | |

(56) References Cited

U.S. PATENT DOCUMENTS

| | | |
|---|---|---|
| 2013/0332353 A1 | 12/2013 | Aidasani et al. |
| 2014/0030980 A1 | 1/2014 | D'Ambrosio |
| 2014/0058937 A1 | 2/2014 | Watson |
| 2014/0108260 A1 | 4/2014 | Poole et al. |
| 2014/0129438 A1 | 5/2014 | Desai et al. |
| 2014/0162598 A1 | 6/2014 | Villa-Real |
| 2014/0244494 A1 | 8/2014 | Davis et al. |
| 2014/0244495 A1 | 8/2014 | Davis et al. |
| 2014/0325614 A1 | 10/2014 | Rhelimi |
| 2014/0344153 A1 | 11/2014 | Raj et al. |
| 2014/0362056 A1 | 12/2014 | Zambetti et al. |
| 2014/0365882 A1 | 12/2014 | Lemay |
| 2014/0365912 A1 | 12/2014 | Shaw et al. |
| 2014/0365919 A1 | 12/2014 | Shaw et al. |
| 2014/0365953 A1 | 12/2014 | Zambetti et al. |
| 2015/0058191 A1 | 2/2015 | Khan et al. |
| 2015/0186871 A1 | 7/2015 | Laracey |
| 2015/0213542 A1* | 7/2015 | Wallaja .............. G06Q 20/3226 705/14.55 |
| 2015/0227925 A1 | 8/2015 | Filler |
| 2015/0271091 A1 | 9/2015 | Maruyama |
| 2015/0348007 A1 | 12/2015 | Khan et al. |
| 2015/0348009 A1 | 12/2015 | Brown et al. |
| 2015/0348025 A1 | 12/2015 | Brown et al. |
| 2015/0356602 A1 | 12/2015 | Moore et al. |
| 2016/0037345 A1 | 2/2016 | Margadoudakis |
| 2016/0203467 A1 | 7/2016 | Khan et al. |
| 2016/0300211 A1 | 10/2016 | Brown et al. |
| 2016/0379205 A1 | 12/2016 | Margadoudakis |
| 2017/0010771 A1 | 1/2017 | Bernstein et al. |
| 2017/0010846 A1 | 1/2017 | Bernstein et al. |
| 2017/0010847 A1 | 1/2017 | Bernstein et al. |
| 2017/0286938 A1 | 10/2017 | Brown et al. |
| 2019/0073102 A1 | 3/2019 | Shaw et al. |
| 2019/0220134 A1 | 7/2019 | Sepulveda et al. |
| 2020/0042970 A1 | 2/2020 | Brown et al. |
| 2020/0249720 A1 | 8/2020 | Sepulveda et al. |
| 2021/0095852 A1 | 4/2021 | Jones et al. |

FOREIGN PATENT DOCUMENTS

| | | |
|---|---|---|
| CN | 101933246 A | 12/2010 |
| CN | 102160070 A | 8/2011 |
| CN | 102215053 A | 10/2011 |
| CN | 102254259 A | 11/2011 |
| CN | 102498705 A | 6/2012 |
| CN | 102906766 A | 1/2013 |
| CN | 101809633 B | 3/2013 |
| CN | 103310337 A | 9/2013 |
| CN | 103745350 A | 4/2014 |
| CN | 102687485 B | 12/2015 |
| CN | 105308634 A | 2/2016 |
| CN | 102656599 B | 9/2016 |
| CN | 106233241 A | 12/2016 |
| CN | 106233314 A | 12/2016 |
| CN | 106445184 A | 2/2017 |
| CN | 107665047 A | 2/2018 |
| CN | 110570180 A | 12/2019 |
| DK | 201670559 B | 7/2016 |
| DK | 201770561 A1 | 2/2018 |
| DK | 201670555 B | 10/2018 |
| EP | 2388744 A2 | 11/2011 |
| EP | 2956825 A2 | 12/2015 |
| EP | 2956825 A2 | 4/2016 |
| EP | 3097472 A1 | 11/2016 |
| EP | 3149679 A1 | 4/2017 |
| EP | 3379441 A1 | 9/2018 |
| EP | 3130999 A1 | 1/2019 |
| EP | 3465408 B1 | 8/2020 |
| EP | 3699746 A1 | 8/2020 |
| GB | 2237486 A | 5/1991 |
| GB | 2277183 A | 10/1994 |
| GB | 2407189 A | 4/2005 |
| IN | 201617036149 | 3/2017 |
| JP | 2000200315 A | 7/2000 |
| JP | 2014532208 A | 12/2014 |
| JP | 2016518361 A | 6/2016 |
| JP | 2016522510 A | 7/2016 |
| JP | 2016158867 A | 9/2016 |
| JP | 2017504128 A | 2/2017 |
| JP | 2017076173 A | 4/2017 |
| JP | 2018173974 A | 11/2018 |
| JP | 2019527891 A | 10/2019 |
| JP | 6700471 B2 | 5/2020 |
| JP | 2020149697 A | 9/2020 |
| KR | 1020070048860 A | 5/2007 |
| KR | 1020110005889 U | 6/2011 |
| KR | 20110094732 A | 8/2011 |
| KR | 20140023605 A | 2/2014 |
| KR | 20140063816 A | 5/2014 |
| KR | 1020160137640 A | 11/2016 |
| KR | 101831351 B1 | 2/2018 |
| KR | 1020180021223 A | 2/2018 |
| KR | 1020190021487 A | 3/2019 |
| KR | 1020190026028 A | 3/2019 |
| KR | 101982003 B1 | 5/2019 |
| KR | 101952334 B1 | 6/2019 |
| KR | 102065900 B1 | 1/2020 |
| KR | 102071692 B1 | 1/2020 |
| KR | 1020200006172 A | 1/2020 |
| KR | 102104218 B1 | 4/2020 |
| KR | 20200058587 A | 5/2020 |
| KR | 102138609 B1 | 7/2020 |
| KR | 102166223 B1 | 10/2020 |
| KR | 102253482 B1 | 5/2021 |
| NL | 2012929 A | 12/2014 |
| WO | 2008147457 A1 | 12/2008 |
| WO | 2009003941 A1 | 1/2009 |
| WO | 2009039419 A1 | 3/2009 |
| WO | 2010111002 A1 | 9/2010 |
| WO | 2010128442 A3 | 4/2011 |
| WO | 2011100623 A3 | 11/2011 |
| WO | 2013039528 A1 | 3/2013 |
| WO | 2014143843 A1 | 9/2014 |
| WO | 2014143916 A2 | 9/2014 |
| WO | 2014122451 A3 | 10/2014 |
| WO | 2014200730 A1 | 12/2014 |
| WO | 2014200676 A3 | 4/2015 |
| WO | 2014143916 A3 | 6/2015 |
| WO | 2015183412 A1 | 12/2015 |
| WO | 2018022313 A1 | 2/2018 |

OTHER PUBLICATIONS

"Bell ID Secure Element in the Cloud," (product data sheet), Bell ID, [online], 2014, retrieved on Dec. 21, 2014], retrieved from the internet.
Bell ID, Bell ID: Secure Element in the Cloud, YouTube, video file, available online at https://www.youtube.com/watch?v=t5KuxXgW7Qs, Nov. 6, 2013.
Broida, Rick, "iPhone Tip: Select multiple photos to share or to delete", cjnet, Aug. 16, 2010.
Cipriani, Jason, "How to select multiple photos at once in iOS 9", cjnet, Jul. 22, 2015.
Epstein, Video: Forget Smartphones and NFC, 'Coin' is the Future of Payments, BGR, available online at http://bgr.com/2013/11/14/coin-preorders-announcement-payment-solution/, Nov. 14, 2013.
Epstein, Zach, "Video: Forget smartphones and NFC, 'Coin' is the future of payments," Yahoo News, [online], Nov. 14, 2013, Apr. 13, 2012, [retrieved on Nov. 20, 2014], retrieved from the internet.
U.S. Pat. No. 10,489,769.
Horowitz, Paul, "How to Delete Multiple Photos Directly on iPhone", OSXDaily, Jul. 17, 2014.
Horowitz, Paul, "How to Bulk Remove Many Photos on iPhone Quickly with a Date Trick", OSXDaily, Jul. 17, 2014.
Labrou, Yannis, et al. "Wireless Wallet", The First Annual International Conference on Mobile and Ubiquitous Systems: Networking and Services, 2004. MOBIQUITOUS 2004, IEEE, 2004.
Office Action dated Mar. 31, 2021 for U.S. Appl. No. 16/041,614.
Office Action dated May 4, 2021 for U.S. Appl. No. 17/180,662.

(56) References Cited

OTHER PUBLICATIONS

Office Action dated May 12, 2021 for U.S. Appl. No. 16/041,611.
Office Action dated Jun. 1, 2021 for U.S. Appl. No. 16/041,614.
Office Action dated Jun. 10, 2020 for U.S. Appl. No. 16/041,611.
Office Action dated Jun. 10, 2020 for U.S. Appl. No. 16/041,614.
Office Action dated Oct. 3, 2019 for U.S. Appl. No. 16/041,611.
Office Action dated Oct. 3, 2019 for U.S. Appl. No. 16/041,614.
OSXDaily, "How to Select Multiple Photos Quickly on iPhone and iPad with a Drag & Select Gesture", Feb. 8, 2018.
Rakesh, "WiFi Direct is Better Than Bluetooth for Sharing Files Between Android Devices," http://www.droidviews.com/wifi-direct-is-better-than-bluetooth-for-exchanging-files-between-android-devices, Mar. 7, 2013, 12 pages.
Wallen, "Five Useful Tips for Your Samsung Galaxy S III," TechRepublic, http:www.techrepublic.com/blog.smartphones/five-useful-tips-for-your-Samsung-Galaxy-S-III, Nov. 1, 2012, 12 pages.
Wikipedia, "iOS 5," https://en.wikipedia.org/wiki/IOS_5#:~:text=iOS%205%20is%20the%20fifth,6%20on%20September%2019%2C%202012.
Notice of Allowance dated Apr. 13, 2022 for U.S. Appl. No. 16/357,161.
Office Action, dated Aug. 3, 2021 for U.S. Appl. No. 16/357,161.
U.S. Appl. No. 16/041,614 Office Action Communication dated Jan. 14, 2022.
U.S. Appl. No. 16/041,614 Office Communication dated Jul. 15, 2022.
U.S. Appl. No. 16/041,614 Response dated Apr. 14, 2022.
U.S. Appl. No. 16/357,161 Office Communication dated Apr. 13, 2022.
U.S. Appl. No. 16/357,161 Office Communication dated May 5, 2022.
U.S. Appl. No. 16/357,161 Response dated Mar. 30, 2022.
U.S. Appl. No. 16/990,990 Office Action Communication dated Jan. 24, 2022.
U.S. Appl. No. 16/990,990 Office Communication dated Jul. 19, 2022.
U.S. Appl. No. 16/990,990 Response dated Jan. 10, 2022.
U.S. Appl. No. 16/990,990 Response dated Jun. 23, 2022.

* cited by examiner

SCREEN INTERFACE FOR A MOBILE DEVICE APPARATUS

RELATED APPLICATIONS

The present application is a continuation of and claims priority to application Ser. No. 16/357,161 filed on Mar. 18, 2019 which, in turn, is a continuation of application Ser. No. 15/946,722 (U.S. Pat. No. 10,250,734) filed on Apr. 5, 2018 which, in turn, is a continuation of and claims priority to application Ser. No. 15/789,867 filed on Oct. 20, 2017 (U.S. Pat. No. 10,057,400) which, in turn, is a continuation-in-part of and claims priority to application Ser. No. 14/050,332 filed on Oct. 9, 2013 (US20180032997A1) which, in turn, claims priority to Application No. 61/722,122 filed Nov. 2, 2012, which are all incorporated herein by reference.

FIELD OF THE INVENTION AND BACKGROUND

The present invention relates to mobile devices, and more particularly to mobile device screen interfaces.

SUMMARY

In one embodiment, a mobile phone apparatus is provided for: securely storing, at an electronic device, payment information associated with a payment account; detecting a proximate point-of-sale (POS) terminal; in response to detecting the proximate POS terminal, determining that a mechanical input authorizing a payment transaction has not been locally received at the electronic device within a time period; in response to the determination, presenting a stimulus indicating that the mechanical input has not been locally received; detecting subsequent to the stimulus presentation, at the electronic device, a mechanical input; in response to detecting the mechanical input, enabling, at the electronic device, the payment information to be retrieved from the secure element and accessed; and transmitting, from the electronic device, a communication including the payment information to the POS terminal.

In one embodiment, a mobile phone apparatus is provided for: securely storing, at an electronic device, payment information associated with a payment account; detecting, at the electronic device, a payment operation associated with a commerce application program; in response to the detected payment operation, determining that a mechanical input corresponding to an authorization of a payment transaction has not been locally received at the electronic device within a time period; presenting, in response to the determination, a stimulus indicating that the mechanical input corresponding to an authorization of a payment transaction has not been locally received; detecting subsequent to the stimulus presentation a mechanical authorization input, the mechanical authorization input corresponding to an authorization of a payment transaction; enabling, in response to detecting the mechanical authorization input, the payment information to be retrieved; and releasing the payment information to the commerce application program.

In other embodiments, other mobile phone apparatuses are provided that omit one or more of the features mentioned hereinabove, and possibly include other features disclosed herein.

DETAILED DESCRIPTION

Figure 1:
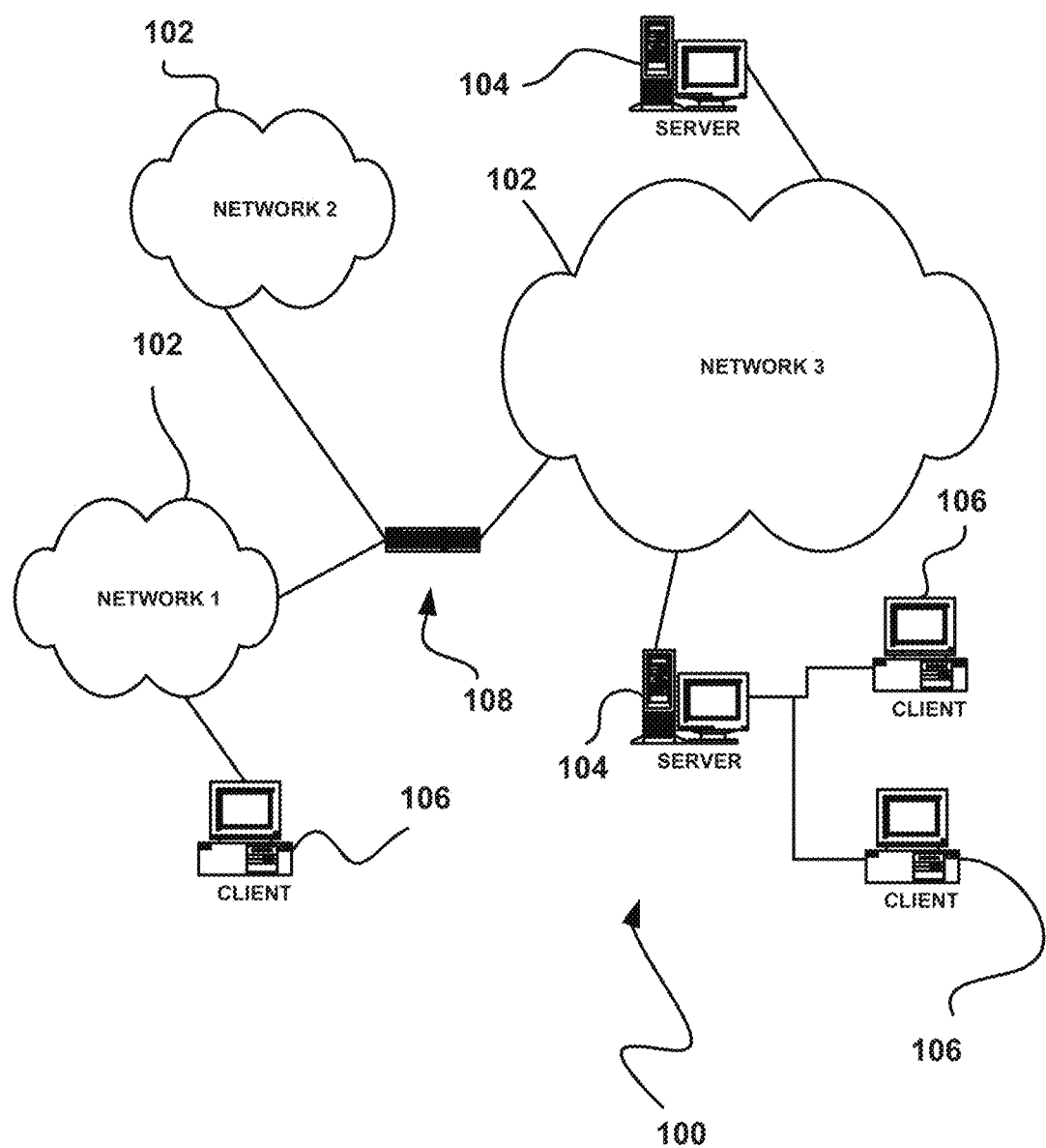
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
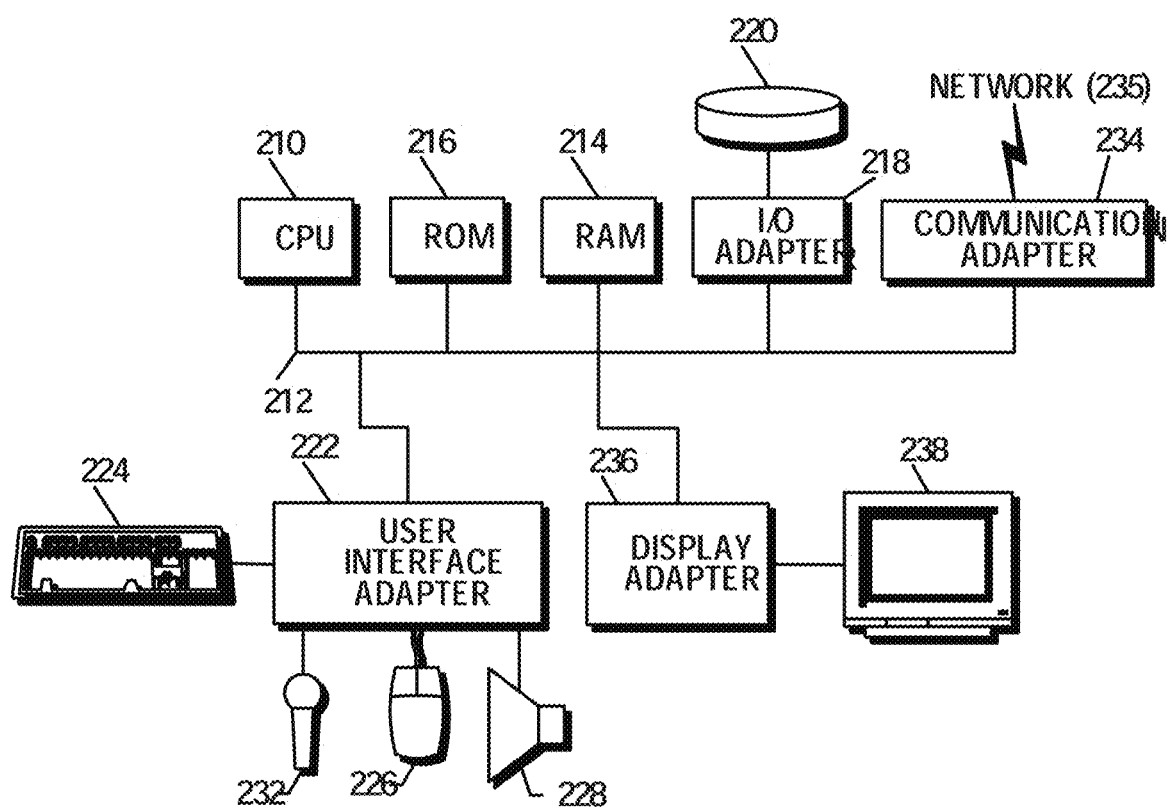
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
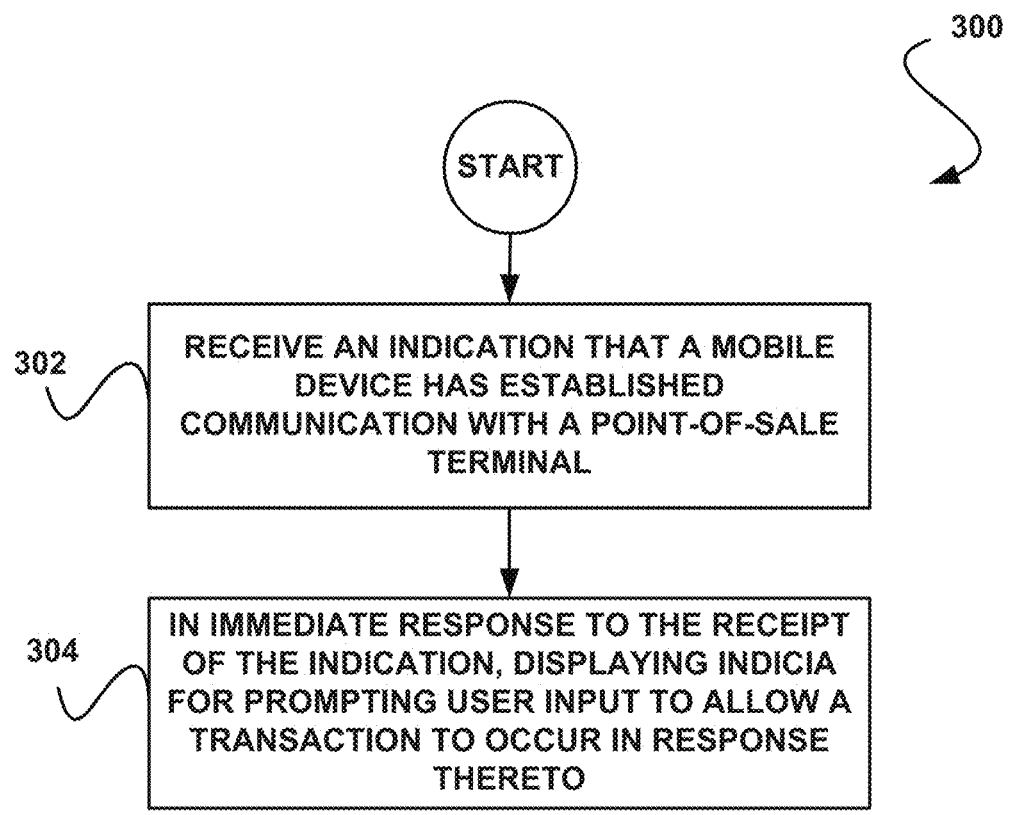
FIG. 3 shows a method for a mobile device transaction, in accordance with one embodiment.

FIG. 3 shows a method 300 for a mobile device transaction, in accordance with one embodiment. As an option, the method 300 may be implemented in the context of the architecture and environment of the previous Figures and/or any subsequent Figure(s). Of course, however, the method 300 may be carried out in any desired environment.

As shown, an indication is received that a mobile device has established communication with a point-of-sale terminal. See operation 302. Further, in immediate response to the receipt of the indication, indicia is displayed for prompting user input to allow a transaction to occur in response thereto. See operation 304.

In the context of the present description, a point-of-sale terminal refers to any terminal capable of facilitating a sale between entities. For example, in one embodiment, the point-of-sale terminal may include a point-of-sale terminal located a retailer location (e.g. a department store, a grocery store, a restaurant, a service center, a fueling station, etc.). As an option, the point-of-sale terminal may or may not be equipped with a cash register, inventory management system, etc.

The mobile device may include any type of mobile device. For example, in various embodiments, the mobile device may include a mobile phone, a tablet computer, an e-reader, a PDA, a handheld computer, a media device (e.g. a digital music player, a digital video player, etc.), and/or any other type of device that is mobile, for that matter.

The communication between the mobile device and the point-of-sale terminal may include various types of communication. For example, in one embodiment, the communication may be established utilizing near field communication (NFC). In another embodiment, the communication may be established utilizing Wi-Fi functionality (e.g. Wi-Fi direct, etc.). In another embodiment, the communication may be established utilizing Bluetooth functionality. In another embodiment, the communication may be established utilizing bump technology (e.g. direct contact, etc.). For example, in one embodiment, such bump technology may or may not include one or more of the features set forth in U.S. Application Publication No.: US2011/0191823A1 filed Feb. 3, 2010, which is incorporated herein by reference for all purposes. In still yet another embodiment, the communication may be established via the Internet (e.g. via a cellular network, Wi-Fi network, etc.).

The indication may be received in a various ways. For example, in one embodiment, the indication may be received based on a physical contact between the mobile device and the point-of-sale terminal. In this case, in one embodiment, the physical contact may be detected utilizing bump technology. In another embodiment, the indication may be received in response to an exchange of information via any of the aforementioned communication techniques (e.g. Wi-Fi, cellular, Internet, etc.).

For instance, in one possible embodiment, a service (administered, for example, by an application on the mobile phone and software at the point-of-sale) may determine that a first dynamic location of the mobile device being determined to be the same (or within a predetermined distance) as a second predetermined location of the point-of-sale terminal. Upon such determination, the service may send an indication signal to the mobile device (e.g. via the application).

In one embodiment, in connection with the indication, transaction information may or may not be received by the mobile device from the point-of-sale terminal. Additionally, in one embodiment, such transaction information may be displayed simultaneously with the indicia. The transaction information may include any information associated with a transaction. For example, in various embodiments, the transaction information may include a price, credit card information, loyalty information, product information, store information, time information, location information, discount information, method of purchase information, and/or any other type of transaction-related information.

Further, the indicia displayed for prompting user input to allow the transaction to occur may include any type of indicia capable of prompting the aforementioned user input. For example, in one embodiment, the indicia may include an accept icon. The accept icon may include any icon indicating acceptance of the transaction. For example, in one embodiment, the accept icon may include an icon with the word "Accept." In another embodiment, the accept icon may include a thumbs-up icon. In another embodiment, the accept icon may include an "OK" indicator. In another embodiment, the accept icon may include a "YES" indicator. In another embodiment, the accept icon may include a "Purchase" indicator. In another embodiment, the accept icon may include a transaction price indicator, capable of being selected to indicate acceptance. In another embodiment, the accept icon may include a button. In another embodiment, the accept icon may include a slider.

Additionally, in one embodiment, the indicia may include a password entry menu. For example, a keyboard may be presented to a user of the mobile device, along with an entry portion. As an option, the password entry may be displayed in response to a slide gesture in connection with a slider icon.

In another embodiment, the indicia may include fingerprint scanner indicia. For example, in one embodiment, an indicator (and/or text) to scan a fingerprint may be displayed on the screen of the mobile device. In another embodiment, an area to scan a fingerprint may be displayed on at least a portion of a screen of the mobile device. In one embodiment, the user may be prompted to capture an image of a fingerprint, for analysis.

In another embodiment, the indicia may include facial recognition indicia. For example, in one embodiment, an indicator (and/or text) to scan or present a face may be displayed on the screen of the mobile device. In another embodiment, a button or icon to capture a face may be displayed on at least a portion of a screen of the mobile device.

In another embodiment, the indication may be capable of being received while a screen-lock graphical user interface is being displayed by the mobile device. For example, in one embodiment, the user may be required to enter a password/passcode to access some or most functionally associated with the mobile device. In this case, in one embodiment, the screen-lock graphical user interface may be displayed, and the indication may be capable of being received and/or the indicia may be capable of displayed on the screen-lock graphical user interface. In one embodiment, the indicia may be capable of being displayed on a portion of the screen-lock graphical user interface (e.g. between an upper time and/or date indicia and lower screen-lock graphical user interface functionality in the form of a slider bar and/or password entry interface, etc.).

In another embodiment, the indication may be capable of being received while the mobile device is in a standby mode. In one embodiment, the standby mode may include displaying a standby screen on the mobile device. In another embodiment, the standby mode may include the display (e.g. backlight, etc.) of the mobile device being powered off. In this case, in one embodiment, the indication may cause the automatic powering of the display screen (e.g. backlight, etc.), in addition to the display of the indication. In such embodiment, after the display screen is powered on, the indication may or may not be displayed in connection with a screen-lock graphical user interface (as set forth in the previous embodiment).

In yet another embodiment, the indicia may be displayed utilizing a transaction application installed on the mobile device. For example, in one embodiment, a mobile wallet application may be installed on the mobile device. In this case, in one embodiment, the mobile wallet application or an application associated therewith may be utilized to display the indicia.

In another embodiment, the indicia may be displayed utilizing a transaction application installed on the mobile device, that is automatically executed in immediate response to the receipt of an indication that the mobile device has established a first communication with the point-of-sale terminal via a first communication protocol other than a second communication protocol associated with the established communication that allows the transaction to occur. The communication protocols may include any type of protocol. For example, in one embodiment, the first communication protocol may include a Wi-Fi or Bluetooth communication protocol and the second communication protocol may include a near field communication protocol. In another embodiment, the first communication protocol and/or the second communication protocol may include a cellular, Internet, Wi-Fi, Bluetooth, and/or a near field communication protocol.

In another embodiment, pre-transaction functionality may be provided by the transaction application. In various embodiments, the pre-transaction functionality may include advertising, suggestion-related functionality, location-related functionality (e.g. store location related functionality, product-related functionality, etc.), point-of-sale terminal-related functionality, and/or loyalty-related functionality, etc. In one embodiment, the pre-transaction functionality may be utilized to initiate a transaction.

In one embodiment, it may be desired that the pre-transaction functionality occur before reaching a point-of-sale termination. Thus, in one possible embodiment, a service (administered, for example, by an application on the mobile phone and software at the point-of-sale terminal) may determine that a first dynamic location of the mobile device being within a predetermined distance (e.g. a few feet, yards, within a radius, within a building/retail location perimeter, etc.) of a second predetermined location of the point-of-sale terminal. Upon such determination, the service may send an indication signal to the mobile device (e.g. via the application) to initiate or otherwise cause the pre-transaction functionality.

Additionally, in one embodiment, the indication may be received based on a physical contact between the mobile device and the point-of-sale terminal. In one embodiment, the physical contact may include physical contact with a designated portion of the mobile device and/or the point-of-sale terminal. In another embodiment, the indication may be received based on close physical proximity between the mobile device and the point-of-sale terminal. Further, in one embodiment, the physical contact may be detected utilizing bump technology.

The transaction information may be received from a variety of devices. For example, in one embodiment, the transaction information may be received by the mobile device from the point-of-sale terminal. In another embodiment, the transaction information may be received by the mobile device from a network server. In another embodiment, the transaction information may be received by the mobile device from a payment provider service or server.

In one embodiment, the transaction information may be displayed simultaneously with the indicia. For example, in various embodiments, a price, credit card information, and/or loyalty information may be displayed simultaneously with an accept icon, a password entry menu, a fingerprint scanner indicia, and/or a facial recognition indicia. Further, in one embodiment, the indicia may be displayed utilizing a transaction application installed on the mobile device, which may be automatically executed in immediate response to the receipt of the indication. In various embodiments, the transaction application may include a mobile payment application, a mobile wallet application, a credit card application, and/or various other transaction-related applications.

In another embodiment, the indicia may be displayed utilizing a transaction application installed on the mobile device that provides post-transaction functionality. In various embodiments, the post-transaction functionality may include at least of advertising, loyalty-related functionality, return visit-related functionality, and/or suggestion-related information. Of course, embodiments are contemplated whereby the post-transaction functionality is provided without a transaction application (e.g. via a web-service, browser, etc.).

The user input prompted by the indicia may include various user input. For example, in various embodiments, the user input that is prompted may be in direct connection with the indicia (e.g. touch the icon displayed with a touchscreen, etc.) and/or may be indirectly connected (e.g. indicia prompting user input via a mechanical button, voice input, etc. and/or other input not based on the touch screen, etc.). In one embodiment, the indicia may instruct the user to provide a specific input. For example, in one embodiment, the indicia may include text instructions. Further, in various embodiments, the user input may include a finger swipe, a finger depression, an image of the user (e.g. for the purposes of facial recognition, etc.), voice input, text input, and/or various other user input.

In one embodiment, the indicia may be displayed in immediate response to the receipt of the indication, by displaying the indicia without any intermediate graphical user interfaces. For example, in one embodiment, upon a mobile device establishing communication with the point-of-sale terminal, the indicia for prompting the user input may be automatically and immediately displayed on a screen of the mobile device. In one embodiment, the indicia for prompting the user input may be automatically and immediately displayed on a screen of the mobile device only if a potential transaction is available (e.g. if there are item in a digital shopping cart, if there are items in a physical shopping cart, etc.).

Further, in one embodiment, the transaction may be immediately allowed to occur in response to the receipt of the user input. In one embodiment, the transaction may be immediately allowed to occur in response to the receipt of the user input, by allowing the transaction to occur without any additional graphical user interfaces.

In one embodiment, the mobile device and/or the point-of-sale terminal may include transaction-related functionality. In various embodiments, the transaction-related functionality may include pre-transaction functionality, a transaction, and/or post-transaction functionality. It should be noted that the aforementioned pre-transaction, transaction, and/or post-transaction functionality may or may not include any of the techniques disclosed during the description of any of the figures herein. Further, in one embodiment, the transaction-related functionality may be provided by a transaction application installed on the mobile device.

Still yet, in one embodiment, the point-of-sale terminal may be associated with (e.g. in communication with, etc.) one or more service providers (e.g. advertisers, social network systems, retailers, etc.). Additionally, in one embodiment, the point-of-sale terminal and/or the mobile device may be in communication with a system capable of storing profile information associated with members of a service network, storing advertisement trigger information associated with advertisements of an advertiser, and/or for causing presentation of at least one of the advertisements outside of the service network, based on the profile information and the advertisement trigger information. Of course, any description herein of such presentation of one or more advertisements outside of the service network (and any related functionality disclosed herein) may be implemented without involving a point-of-sale terminal.

In various embodiments, the service network may include at least one of a social network, an e-commerce network, an e-wallet network, or a search network, etc. Further, the profile information may include any type of profile information. For example, in one embodiment, the profile information may include interest information and/or demographic information.

Of course, in various embodiments, the profile information may include any type of information, such as browsing history, social network information, a gender, an age, a birth date, an astrological sign, a nationality, a religion, a political affiliation (e.g. Democrat, Republican, etc.), a height, a weight, a hair color, an eye color, an ethnicity, a living address (e.g. a home address, etc.), a work address, an occupation (e.g. student, engineer, barista, unemployed, etc.), a sexual preference, an education level (e.g. a high school education, a college education, a postgraduate degree, etc.), a birth place, a school attended (e.g. an elementary school attended, a middle school attended, a high school attended, a college attended, etc.), an area once lived (e.g. during adolescence, after high school, during adult years, etc.), a relationship status (e.g. single, married, significant other, etc.), a family status (e.g. living parents, divorced parents, estranged from parents, etc.), a number of siblings, an income level, a car status (e.g. a car model, a car make, a car year, a car price, etc.), a number of children, hobbies (e.g. reading, running, volunteering, biking, golf, climbing, etc.), exercise habits (e.g. number of hours/minutes a week, number of times a month, type of exercise preferred, etc.), a number of pets owned, a type of pets owned (e.g. dogs, cats, fish, gerbils, etc.), food preferences (e.g. vegetarian, vegan, mainly meat, Chinese cuisine, Mexican cuisine, etc.), drinking habits (e.g. daily, weekly, monthly, etc.), eating habits (e.g. eat in, dine out, snacks, meals, etc.), TV watching preferences (e.g. types of preferred shows, number of hours/minutes per day/week, etc.), movie watching preferences (e.g. types of preferred movies, number of movies per day/week/month, etc.), music preferences (e.g. preferred genre, preferred artist, etc.), sleeping preferences (e.g. the number of hours of sleep preferred, the preferred bed time/rise time, etc.), moods (e.g. generally a good mood, generally a bad mood, etc.), feelings (e.g. generally happy, generally sad, generally angry, etc.), desires (e.g. goals, wishes, etc.), and/or any other personal information.

In various embodiments, the personal information may include permanent personal information (e.g. physical traits, history, etc.), temporal personal information (e.g. what the user is doing/feeling/experiencing now or within a predetermined window of time, etc.), and/or future goal-oriented personal information (e.g. wants, desires, etc.).

In one optional embodiment, the personal information may be received in association with a social networking site that allows users to define themselves in a profile (e.g. which may include any one or more of the personal information parameters disclosed hereinabove and/or herein below, etc.); associate themselves with others (e.g. friends, colleagues, other groups, etc.) by connecting to each other; and/or engage in activities (e.g. using applications such as games, reviewing content, sharing content (e.g. interests, thoughts, questions, media, etc.), etc.

In such embodiment, the personal information may be received from a social networking profile of the user associated with a social networking site. Further, the personal information may include any entities (e.g. people, groups, institutions, products, etc.) to which the user is associated (e.g. connected, subscribed, linked) during use of the social networking site. Such associations may also be extended to "associations-of-associations" (e.g. friends of friends, etc.). Even still, tracking such associations as personal information may be extended to a threshold number (e.g. 1, 2, 3, 4, 5, etc.) of degrees-of-separation. As a further option, the personal information may be received based on any of the aforementioned activity of the user in connection with the social networking site. In such example, any profiling metadata collected based on the activity of the user may be utilized as the personal information.

One optional embodiment is contemplated wherein an on-line application associated with the social networking site may collect and/or use the aforementioned social networking site-related personal information in connection with any of the functionality disclosed hereinabove and/or herein below. Of course, such social networking site-related on-line application may do so by itself and/or in connection with other one or more social networking site-related on-line application(s) or separate/independent site-related on-line application(s).

In one embodiment, a pre-existing social networking site may be leveraged to accomplish any one or more of the operations disclosed herein. With that said, any site that collects any of the personal information disclosed herein may optionally be used in lieu of or in combination with the aforementioned social networking site. For example, an e-commerce site (e.g. product supply website, etc.) that collects profile information, etc. may be utilized in a similar manner.

More information regarding leveraging service providers to collect information may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S.

Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

Further, in one embodiment, targeted advertisements may be presented to the user on the mobile device, based on any user information. In one embodiment, the advertisement may be presented outside of the service network. In this case, in one embodiment, the presentation of the advertisement outside of the service network may be accomplished by the service network transmitting a signal outside the service network.

Further, in one embodiment, the signal may be time-stamped. Additionally, in one embodiment, the presentation of the at least one advertisement outside of the service network may be accomplished by the service network transmitting the advertisement outside the service network. In one embodiment, a format of the advertisement may be based on presentation medium specification information. For example, in one embodiment, the advertisement may be formatted to present on the mobile device. In another embodiment, the advertisement may be formatted to be presented on a display associated with the point-of-sale terminal. In another embodiment, the advertisement may be formatted to be displayed on a billboard and/or an in store display. In still another embodiment, the advertisement may be displayed via a television.

Additionally, in one embodiment, the at least one advertisement may be time-stamped. In one embodiment, the time stamp me be utilized to determine a duration in which the advertisement is to be displayed. In another embodiment, the time stamp may be utilized to determine a time in which the advertisement is to expire.

Further, in one embodiment, the advertisement may be presented via a server in communication with a plurality of presentation mediums, where the server is operable to cooperate with the server network. In another embodiment, the advertisement may be presented via at least one of a plurality of presentation mediums each with client code operable to cooperate with the server network. In various embodiments, the advertisement may be presented by the advertiser or a party separate from the service network and the advertiser.

Additionally, in one embodiment, the advertisement may be presented based on location information associated with members of the service network. In one embodiment, the location information may be determined by the service network. In various embodiments, the location information may be determined utilizing GPS, Wi-Fi, an IP address, and/or various other techniques (e.g. manual indication by the member(s), etc.). Furthermore, in various embodiments, the service network may include any number of service networks, such as a social network, an e-commerce network, an e-wallet network, and/or a search network, etc.

More illustrative information will now be set forth regarding various optional architectures and features with which the foregoing techniques discussed in the context of any of the present or previous figure(s) may or may not be implemented, per the desires of the user. For instance, various optional examples and/or options associated with the communication/indication of operation 302, the transaction/indicia of operation 304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 4:
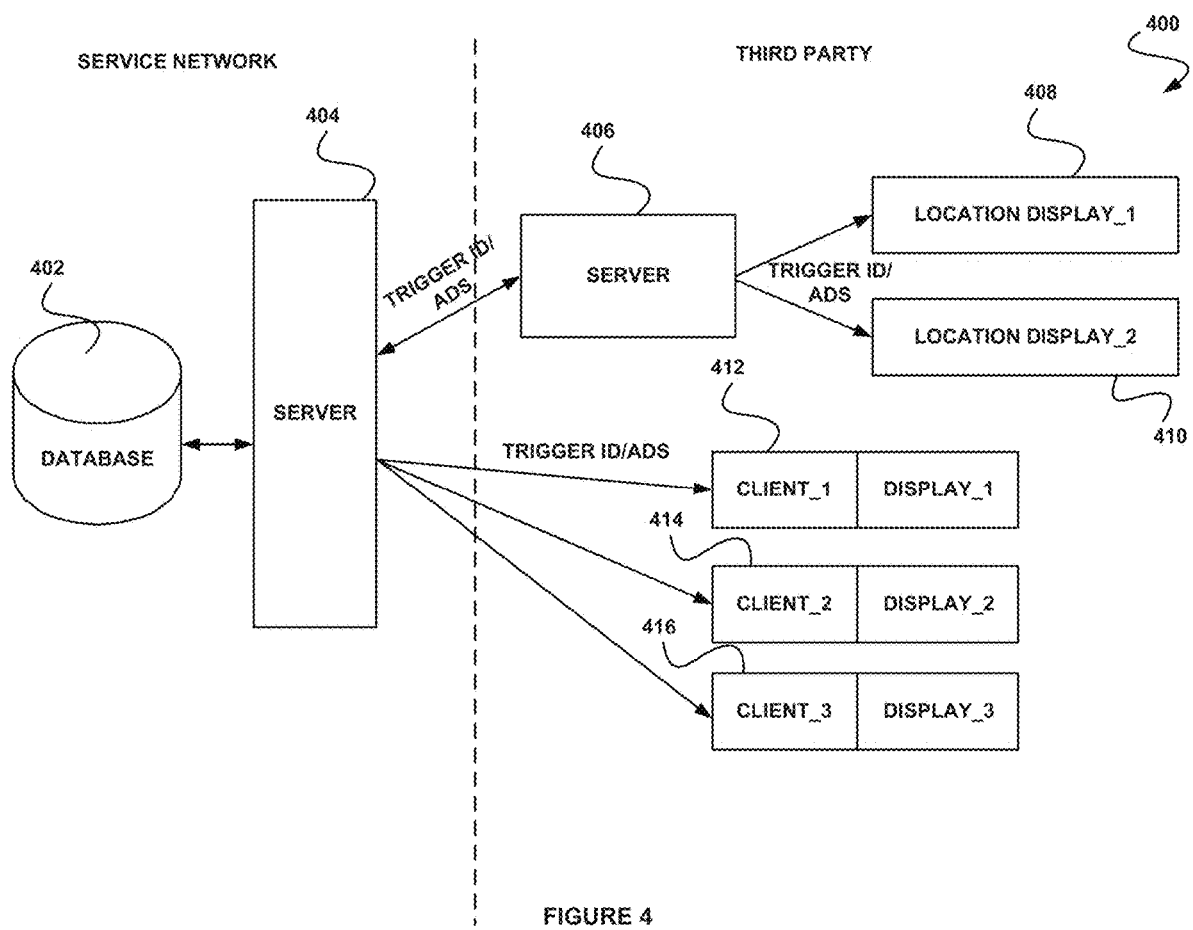
FIG. 4 shows a system for mobile device transactions, in accordance with another embodiment.

FIG. 4 shows a system 400 for mobile device transactions, in accordance with another embodiment. As an option, the system 400 may be implemented in the context of the architecture and environment of the previous Figures and/or any subsequent Figure(s). Of course, however, the system 400 may be implemented in the context of any desired environment. It should also be noted that the aforementioned definitions may apply during the present description.

As shown, a service network system may include a database 402 and server 404. The service network system may be associated with a variety of service networks, including a social network, a retailer, a payment provider, payment facilitator, an advertiser, a search engine system, a mobile wallet system, a media provider, and/or any other service network system that provides one or more services to its members.

The service network system may be in communication with one or more third party systems. For example, in one embodiment, the service network system may be in communication with a third party retailer, advertiser, and/or payment system that each include one or more third party server(s) 406. Additionally, in one embodiment, the service network system may be in communication with one or more third party client devices 412-416. In various embodiments, the client devices may include mobile phones, computers, media devices, displays, payment systems, point-of-sale terminals, and/or various other devices.

In another embodiment, the devices 408-418 may include a vehicular head-unit display associated with a vehicular assembly. One example of such a vehicular assembly may include that which is disclosed in U.S. Pat. No. 8,131,458 issued Mar. 6, 2012 and entitled "SYSTEM, METHOD, AND COMPUTER PROGRAM PRODUCT FOR INSTANT MESSAGING UTILIZING A VEHICULAR ASSEMBLY," which is incorporated herein by reference in its entirety. In the present embodiment, such head-unit display may communicate with the servers 404 and/or 406 via a communication channel of a mobile device (as taught in U.S. Pat. No. 8,131,458). Of course, in other embodiments, the vehicle (and thus the head-unit display) may be equipped with its own modem for communicating directly with the servers 404 and/or 406.

In different embodiments, the displays 408-416 may or may not be equipped with software (e.g. a plug-in and/or an application program, etc.) for providing an interface to receive/send signals with respect to the server 406 and/or 404. Such software may also include interface code (e.g. driver, etc.) for accommodating the specific protocol/format, etc. of the displays 408-416 and otherwise controlling the same (and content displayed). In other embodiments, of course, the signals/control administered by the server 406 and/or 404 may be standardized such that communications may be directed at the displays 408-416 without the need for additional software.

Furthermore, in one embodiment, the service network system may be in communication with systems/displays dedicated (at least in part) to displaying advertisements, deals, and/or for facilitating payment of products and/or services. For example, in one embodiment, the service network system may be in communication with a third party server 406 and/or one or more location specific displays 408-410.

In the context of the present description, a location specific display refers to a display associated with a location. For example, in various embodiments, the location specific display may include a display at a business location (e.g. a monitor, a television, a computer display, etc.), a billboard, a display associated with a point-of-sale terminal, a display associated with a product/service (e.g. a display at a gas pump, etc.), and/or any other type of display.

The communication between the service network system and the third party system may be facilitated utilizing a variety of techniques. For example, in one embodiment, the communication between the service network system and the third party system may include direct communication (e.g. a wireless direct connection, a wired direct connection, etc.). In another embodiment, the communication between the service network system and the third party system may include indirect communication (e.g. communication via a server, communication via a cloud, communication via one or more other systems, etc.).

In operation, in one embodiment, the service network may be operable to cause the display of targeted advertisements and/or targeted content on the location specific displays 408-410 and/or the client devices 412-416. In one embodiment, the service network system may push the advertisements (e.g. including advertisement content, etc.) to the location specific displays 408-410 and/or the client devices 412-416. In another embodiment, the service network system may push an advertisement trigger ID to another system (e.g. the server 406, etc.) such that the advertisements are displayed on the location specific displays 408-410 and/or the client devices 412-416. Of course, in some embodiments, the aforementioned advertisement trigger ID may be sent directly to the location specific displays 408-410 and/or the client devices 412-416, for using the same to access appropriate advertisements locally and/or remotely.

For example, in one embodiment, it may be determined that a user is in the vicinity of the one or more location specific displays 408-410. Accordingly, in one embodiment, targeted content and/or advertisements may be presented to the user on the one or more location specific displays 408-410. In one embodiment, the targeted content and/or advertisements presented to the user on the one or more location specific displays 408-410 may include targeted content and/or advertisements associated with the location.

The location of the user may be determined utilizing a variety of techniques. For example, in one embodiment, the user may digitally check in to a location. In various embodiments, the user may check-in to the location utilizing a mobile device associated with the user, a system associated with the location, and/or another device. In one embodiment, the user may check in to a location utilizing an application stored on the mobile device of the user. In various embodiments, the application may include a social network application, an application associated with the location, a mapping application, a geo-caching application, a mobile payment application, and/or various other applications. In another embodiment, the user may check in to a location utilizing a check-in system associated with the location.

In another embodiment, a mobile device of the user may be utilized to automatically check in to a location. For example, in one embodiment, an application stored on the mobile device may be utilized to automatically check in to a location (e.g. based on a wireless signal, based on a wireless network availability, based on GPS, a bump signal, an NFC signal, etc.).

More information regarding checking in to a location, etc. may be found in U.S. Provisional Patent Application No. 61/590,767, filed Jan. 25, 2012, titled "SYSTEM, METHOD AND COMPUTER PROGRAM PRODUCT FOR LOCATION-SPECIFIC PRIVACY SETTINGS;" U.S. Provisional Patent Application No. 61/591,819, filed Jan. 27, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION;" and U.S. Provisional Patent Application No. 61/596,174, filed Feb. 7, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION," which are each incorporated herein by reference in their entirety.

Further, in one embodiment, the location of the user may be determined based on GPS. For example, the mobile device (and/or an application/OS associated therewith) may share GPS data associated with the mobile device, such that the location of the mobile device/user is determined. In one embodiment, the GPS data may be shared with the service network system. In another embodiment, the GPS data may be shared with one or more third party systems.

In another embodiment, the location of the user may be determined based on a signal provided by the mobile device of the user. For example, in one embodiment, the mobile device of the user may provide a Bluetooth signal that is capable of being received by a device associated with the location (e.g. a display, a computer, a location detection device, a point-of-sale device, etc.), such that location may be determined. In another embodiment, the mobile device of the user may provide a NFC signal that is capable of being received by a device associated with the location (e.g. a display, a computer, a location detection device, a point-of-sale device, etc.), such that location may be determined.

In another embodiment, the mobile device of the user may provide a Wi-Fi signal that is capable of being received by a device associated with the location (e.g. a router, a display, a computer, a location detection device, a point-of-sale device, etc.), such that location may be determined. In another embodiment, the mobile device of the user may provide a chirp signal that is capable of being received by a device associated with the location, such that location may be determined. In one embodiment, the chirp signal may include information associated with the location (e.g. GPS coordinates, etc.). In one embodiment, a signal strength associated with the chirp may be used to associate the user with a location.

In another embodiment, the mobile device may be connected to a wireless network associated with the location automatically (or manually), such that a location may be determined. In still another embodiment, the location of the user may be determined utilizing facial recognition techniques. For example, in one embodiment, a system associated with the location may be utilized to determine the user is present based on facial recognition.

More information regarding facial recognition and other features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

In another embodiment, the location of the user may be determined utilizing social network status associated with the user. Optionally, such social network status may be set by another person (e.g. friend, etc. of the user, etc.). This may be accomplished by "tagging" the user in association with a particular location (e.g. by naming the location or tagging the user in association with a location associated with the friend, etc.).

In another embodiment, the location of the user may be determined based on an action of the user. For example, in one embodiment, the user may utilize the mobile device to scan a bar code of an item (e.g. a product, a poster, a billboard, etc.), such that the location of the user may be determined. In another embodiment, the user may utilize the mobile device to capture an image of an item (e.g. a building, a sign, a product, a poster, a billboard, etc.), such that the location of the user may be determined.

In another embodiment, the location of the user may be determined and/or the aforementioned/following determination techniques may be confirmed by an interaction of the user with the display. As an option, such interaction may include detecting a touch or gesture (or other input) by the user of a touchscreen associated with the display (408-416) and/or a separate control display/controller associated with the display (408-416).

In another embodiment, the user may utilize the mobile device to facilitate a purchase at a location (e.g. utilizing an e-wallet application, utilizing a digital credit card, utilizing a digital debit card etc.), such that the location of the user may be determined. In another embodiment, the user may utilize a payment technique attributable to the user to facilitate a purchase at a location (e.g. utilizing gift card, utilizing a credit card, utilizing a debit card etc.), such that the location of the user may be determined. In another embodiment, the user may scan a loyalty card at a location, such that the location of the user may be determined. Of course, any technique may be utilized to determine a location associated with the user.

Once the location of the user is determined, in one embodiment, it may or may not be determined whether the user is in the vicinity of a display capable of displaying targeted advertisements/content. In one embodiment, the location specific display (or a system associated therewith) may determine the user is in the vicinity (e.g. utilizing one of the various location determination techniques described, etc.). In another embodiment, the location of the location specific displays may be known. For example, in one embodiment, the location specific displays may be registered and the location may be logged (e.g. utilizing the database 402, the server 404, another database or server, etc.).

If the location of the location specific display is known, and the location of the user is known (at least to within a threshold distance, etc.), targeted advertisements/content may be displayed to the user on the location specific displays 408-410 and/or on the client devices 412-416, based on the location of the user. As an example, the user may utilize the client device 412 (e.g. a point-of-sale terminal, etc.) to initiate a purchase of products. Accordingly, the location of the user and the client device 412 are determined and targeted advertisements/content may be presented to the user on a display associated with the client device 412.

As another example, the location of the user may be determined (e.g. utilizing one or more of the location determination techniques described above, etc.) and it may be determined that the user is in the vicinity of a known location specific display 408. Accordingly, targeted advertisements/content may be presented to the user on the location specific display 408.

As yet another example, the location specific display may determine that the user is in the vicinity (e.g. utilizing one or more of the location determination techniques described above, etc.). Accordingly, targeted advertisements/content may be presented to the user on the location specific display 408. In one embodiment, the targeted advertisements/content may be pushed from the service network system server 404 (e.g. to the location specific displays 408-410 and/or the client devices 412-416, etc.). In another embodiment, the targeted advertisements/content may be pushed from the third party system server 406 (e.g. to the location specific displays 408-410 and/or the client devices 412-416, etc.).

The targeted advertisements/content may be determined utilizing a variety of criteria associated with the user and/or the location. For example, in one embodiment, social network information may be utilized to determine targeted advertisements/content. In another embodiment, online retailer information may be utilized to determine targeted advertisements/content.

In another embodiment, previous purchase information may be utilized to determine targeted advertisements/content. In another embodiment, mobile wallet application information may be utilized determine targeted advertisements/content. In another embodiment, loyalty information may be utilized determine targeted advertisements/content. In another embodiment, personal information may be utilized determine targeted advertisements/content.

More information regarding targeted advertisements/content and the information utilized to determine such advertisements/content may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

In various embodiments, the personal information may include any type of information, such as browsing history, social network information, a gender, an age, a birth date, an astrological sign, a nationality, a religion, a political affiliation (e.g. Democrat, Republican, etc.), a height, a weight, a hair color, an eye color, an ethnicity, a living address (e.g. a home address, etc.), a work address, an occupation (e.g. student, engineer, barista, unemployed, etc.), a sexual preference, an education level (e.g. a high school education, a college education, a postgraduate degree, etc.), a birth place, a school attended (e.g. an elementary school attended, a middle school attended, a high school attended, a college attended, etc.), an area once lived (e.g. during adolescence, after high school, during adult years, etc.), a relationship status (e.g. single, married, significant other, etc.), a family status (e.g. living parents, divorced parents, estranged from parents, etc.), a number of siblings, an income level, a car status (e.g. a car model, a car make, a car year, a car price, etc.), a number of children, hobbies (e.g. reading, running, volunteering, biking, golf, climbing, etc.), exercise habits (e.g. number of hours/minutes a week, number of times a month, type of exercise preferred, etc.), a number of pets owned, a type of pets owned (e.g. dogs, cats, fish, gerbils, etc.), food preferences (e.g. vegetarian, vegan, mainly meat, Chinese cuisine, Mexican cuisine, etc.), drinking habits (e.g. daily, weekly, monthly, etc.), eating habits (e.g. eat in, dine out, snacks, meals, etc.), TV watching preferences (e.g. types of preferred shows, number of hours/minutes per day/week, etc.), movie watching preferences (e.g. types of preferred movies, number of movies per day/week/month, etc.), music preferences (e.g. preferred genre, preferred artist, etc.), sleeping preferences (e.g. the number of hours of sleep preferred, the preferred bed time/rise time, etc.), moods (e.g. generally a good mood, generally a bad mood, etc.), feelings (e.g. generally happy, generally sad, generally angry, etc.), desires (e.g. goals, wishes, etc.), and/or any other personal information.

In various embodiments, the personal information may include permanent personal information (e.g. physical traits, history, etc.), temporal personal information (e.g. what the user is doing/feeling/experiencing now or within a predetermined window of time, etc.), and/or future goal-oriented personal information (e.g. wants, desires, etc.).

Further, in one embodiment, the personal information may be received in association with a social networking site that allows users to define themselves in a profile (e.g. which may include any one or more of the personal information parameters disclosed hereinabove and/or herein below, etc.); associate themselves with others (e.g. friends, colleagues, other groups, etc.) by connecting to each other; and/or engage in activities (e.g. using applications such as games, reviewing content, sharing content (e.g. interests, thoughts, questions, media, etc.), etc. In such embodiment, the personal information may be received from a social networking profile of the user associated with a social networking site. Further, the personal information may include any entities (e.g. people, groups, institutions, products, etc.) to which the user is associated (e.g. connected, subscribed, linked) during use of the social networking site. Such associations may also be extended to "associations-of-associations" (e.g. friends of friends, etc.). Even still, tracking such associations as personal information may be extended to a threshold number (e.g. 1, 2, 3, 4, 5, etc.) of degrees-of-separation. As a further option, the personal information may be received based on any of the aforementioned activity of the user in connection with the social networking site. In such example, any profiling metadata collected based on the activity of the user may be utilized as the personal information.

One optional embodiment is contemplated wherein an on-line application associated with the social networking site may collect and/or use the aforementioned social networking site-related personal information in connection with any of the functionality disclosed hereinabove and/or herein below. Of course, such social networking site-related on-line application may do so by itself and/or in connection with other one or more social networking site-related on-line application(s) or separate/independent site-related on-line application(s).

Still yet, in one embodiment, the database 402 may include loyalty card information. In various embodiments, such loyalty card information may include types of products purchased, frequency that products are purchased, brands of products purchased, number of days/hours shopping per week/month, amount of money spent (e.g. average amount per outing, average amount per month, average amount per week, least amount per outing, etc.), discount amount (e.g. average amount per outing, average amount per month, average amount per week, least amount per outing, etc.), awards points, and/or various other information.

Furthermore, in one embodiment, the database 402 may store location based information. For example, in various embodiments, the database 402 may store information associated with product offerings associated with a location, store options associated with a location, service options associated with a location, advertisements associated with a location, maps associated with the location, and/or various other information.

Further, in one embodiment, the database 402 may store business related information. For example, in various embodiments, the business related information may include business location information, business operation information, business hours, business specials, business offerings, business deals, and/or various other business related information. Additionally, in one embodiment, the database 402 may include targeted content/advertisement information (e.g. advertisement IDs, advertisements, advertisement trigger IDs, etc.).

In various embodiments, any information stored in the database 402 (or any other accessible database, etc.) may be utilized to determine advertisements/content to present to a user. Of course, in one embodiment, the information stored in the database 402 (or any other accessible database, etc.) may be associated with individual users and/or groups of users.

As one exemplary implementation associated with one embodiment, a user may be shopping in a market. Utilizing one or more location determination techniques discussed above, the location of the user may be determined and a display that is capable of being viewed by the user may be determined. In one embodiment, information associated with the user may be utilized to determine an advertisement/content to be presented to the user on the display. In one embodiment, the server 404 may determine the advertisement/content to display, based on the information. In another embodiment, the server 406 may determine the advertisement/content to display, based on the information. In another embodiment, at least one of the client devices 412-416 may determine the advertisement/content to display.

Further, in various embodiments, the server 404 and/or the server 406 may send the targeted advertisements/content and/or advertisement/content trigger IDs. In the case that the server 404 and/or the server 406 sends advertisement/content trigger IDs, the receiving apparatus or system (e.g. the client devices 412-416, the server 406, the location specific displays 408-410, etc.) may utilize the advertisement/content trigger IDs to select and display the advertisement/content. In one embodiment, each advertisement/content or group of advertisements/content may be associated with at least one advertisement/content trigger ID, such that the advertisement/content trigger ID may be utilized to look up associated advertisement/content. In various embodiments, the advertisement/content trigger IDs may include numerical IDs, alpha-numeric IDs, key word IDs, and/or various other IDs. In one embodiment, the third party system may include its own advertisement/content database, where advertisements/content may be accessed.

As another exemplary implementation, a user may be shopping and initiate a checkout/payment utilizing a point-of-sale terminal (e.g. one or more of the client devices 412-416, etc.). In various embodiments, the user may initiate payment utilizing a mobile phone (e.g. in association with an e-wallet application, a credit card application, etc.), a credit card, a loyalty card, a loyalty card and cash, a check, and/or various other techniques. Utilizing loyalty card information, mobile device information, payment information, and/or various other information, the user identification may be determined (and/or information associated with the user, which is capable of being utilized to determined targeted advertisements/content may be determined, etc.). Because the user is checking out at a known location, advertisements/content may be selected for the user (based on known or determined information about the user, etc.) and one or more advertisements/content may be displayed on a display associated with the point-of-sale terminal (and/or a display in proximity to the point-of-sale terminal, on a mobile device of the user, etc.).

The content/advertisements may include any type of content and/or advertisements. For example, in various embodiments, the content/advertisements may include product/service suggestions based on user purchase history, product/service suggestions based on items omitted during checkout, product/service suggestions based on items purchased, product/service suggestions based on location, product/service suggestions based on amount of money spent on particular products/services (e.g. per week, per month, per shopping experience, etc.), product/service suggestions based on a demographic category associated with the user, product/service suggestions based on user personal information, and/or any other type of content/advertisement.

Furthermore, the advertisement/content presentation may be triggered in a variety of ways. For example, in one embodiment, the advertisement/content presentation may be triggered upon initiation of check-out (e.g. upon scanning a loyalty card, upon scanning a first item, etc.). In another embodiment, the advertisement/content presentation may be triggered upon initiation of payment. In another embodiment, the advertisement/content presentation may be triggered upon approval of payment. In another embodiment, the advertisement/content presentation may be triggered upon a determination of a location of the user.

In another embodiment, the advertisement/content presentation may be triggered utilizing a signal associated with the mobile device (e.g. an NFC signal, a Bluetooth signal, a Wi-Fi direct signal, etc.). In another embodiment, the advertisement/content presentation may be triggered based on a facial recognition program identifying the user. In another embodiment, the advertisement/content presentation may be triggered upon a user check-in (e.g. a manual check-in, an automatic check-in, etc.).

In another embodiment, the advertisement/content presentation may be triggered when a user scans an item utilizing the mobile device. For example, in one embodiment, the user may scan a barcode of an item utilizing the mobile device and an advertisement/content may be presented to the user on a display of the mobile device and/or on another display (e.g. a display determined to be in the vicinity of the user, etc.). In another embodiment, the user may capture an image of an item and an advertisement/content may be presented to the user on a display of the mobile device and/or on another display (e.g. a display determined to be in the vicinity of the user, etc.).

In another embodiment, the advertisement/content presentation may be triggered in response to a user request. For example, in one embodiment, a user may utilize an associated mobile device to view available advertisements/content and/or to request targeted advertisements/content. In this case, in various embodiments, the advertisements/content may be displayed on a display associated with the mobile device and/or another display.

In one embodiment, the advertisement/content may be displayed in a non-intrusive manner on the mobile device display. For example, in one embodiment, the advertisement/content may be displayed on a lock screen of the mobile device. In another embodiment, the advertisement/content may be displayed utilizing a specific advertisement/content display application.

More information about non-intrusively displaying advertisements on a mobile device may be found in U.S. Provisional Patent Application No. 61/711,727, filed Oct. 9, 2012, titled "SYSTEM, METHOD, AND COMPUTER PROGRAM PRODUCT FOR DETERMINING WHETHER TO PROMPT AN ACTION BY A PLATFORM IN CONNECTION WITH A MOBILE DEVICE," which is incorporated herein by reference in its entirety.

Further, in one embodiment, an advertisement/content may be displayed on a display separate from a mobile device and the user may have the option to transfer display of the advertisement/content to the mobile device, or to receive the advertisement/content on the mobile device. For example, in one embodiment, an application on the mobile device may present the user an option to display an advertisement/content on the mobile device, which is currently being displayed on a third party display. In another embodiment, bump technology may be utilized to transfer an advertisement/content to the mobile device. For example, in one embodiment, advertisement/content may be displayed on a third party display and a user may touch the display (or an interface associated with the display, etc.) such that the advertisement/content is transferred to the mobile device for display. Of course, in various embodiments, various techniques may be utilized to transfer the advertisement/content to the mobile device.

It should be noted that, although the apparatuses/systems/devices illustrated in FIG. 4 are described in the context of individual devices, in other embodiments, such apparatuses/systems/devices may be combined or implemented across multiple devices. For example, in one embodiment, the database 402 may include a plurality of databases (e.g. controlled by different entities, etc.). In another embodiment, the server 404 may represent a plurality of servers (e.g. controlled by different entities, etc.). Furthermore, in one embodiment, multiple service network systems and/or multiple third party systems may communicate with one another. For example, in one embodiment, a social network system and a mobile wallet system may be in communication and both systems may be capable of communicating with one or more retailers and/or one or more service providers, etc.

To this end, in some embodiments, advertisements (and/or other content) may be displayed to a user in an intelligent manner; without having to necessarily utilize precious interface "real-estate" (i.e. area, etc.) of the mobile device and/or of one particular application (e.g. associated with the service network, etc.) on a mobile device; and/or when the mobile device and/or application is not even being utilized (e.g. viewed, etc.) during a relevant time for the advertisement/content to be displayed, etc. Further, as an option, this may be accomplished by going beyond allowing third parties to associate advertisements with certain profile criteria, for triggering the display of such advertisements in connection with service network content on a service network interface (via a service network application, etc.). Specifically, advertisements/triggers may be associated with certain profile criteria (which may or may not be the same used above), so that, instead of the aforementioned display of the advertisements in connection with service network content, triggers and/or the advertisements are ultimately pushed to a separate display (e.g. 408-416, etc.) or a separate context (e.g. different application, etc.) on the same display/device, for presentation.

Further, the various features disclosed herein may, in some optional embodiments, be accomplished by both the service network and advertiser tracking, storing, sharing, etc. at least one aspect of the user for uniquely or non-uniquely identifying the same, which may be done in an anonymous or non-anonymous manner. In various embodiments, such user identifying aspect may take the form of data that includes and/or is based, at least in part, on service network and/or advertiser username and/or password, a name, an alias, a user ID, a user email address, a user residence or business physical address, a user phone (e.g. cell) number, an application identifier, a user context identifier, a cookie, a session identifier, a purchase receipt reflecting a purchase by the user, a credit card/bank account number and/or alias, a randomly generated identifier, a comment/posting, text/e-mail content, a facial recognition result, a fingerprint scan result, an Internet search query, a photo taken by and/or including the user, a scan of a code (Quick Response Code), an automatically (GPS, WiFi, etc.) generated location, a manual or automatically generated check-in status (e.g. with precise time-stamped location), a bump technology transaction/signal, any unique or semi-unique identifier, etc.). In one embodiment, the user identifying aspect(s) may include any of the location triggers set forth in the context of the description of operation 1102 of FIG. 11, to be set forth hereinafter in greater detail. In various embodiments, the above user identifying aspect(s) may be sourced from the service network (and/or related application), the advertiser, an operating system of the mobile device and/or any other source.

In use, in accordance with one possible embodiment, the aforementioned user identifying aspect may be submitted with, linked to, and/or otherwise associated with a profile-related query that is defined by the advertiser. To this end, the profile criteria associated with various preconfigured advertisements of the advertiser may be compared against the appropriate profile (and content) of the correct/relevant user in the service network database (that is identified by the identifying aspect), to be the subject of presentation of the advertisement.

In various embodiments, the aforementioned user identifying aspect may be encrypted for ensuring anonymity of the user. More information regarding various possible features and/or utilization of the aforementioned user identifying aspect may be found in U.S. Provisional Patent Application No. 61/563,741, filed Nov. 25, 2011, titled "SYSTEM, METHOD, AND COMPUTER PROGRAM PRODUCT FOR PRESENTING DECISION RELATED INFORMATION;" and U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which are incorporated herein by reference in their entirety.

Of course, embodiments are contemplated where the advertisements may also be triggered for display in a manner that utilizes the service network interface(s) and is integrated with service network content (e.g. "on-platform") vs. the aforementioned "off-platform" advertising. In such other embodiments, the on- and off-platform advertising may be coordinated for increased effectiveness. For example, after the display of an off-platform advertisement and in response to user input received in connection with such off-platform advertisement, an additional escalation of advertising may be accomplished by displaying a related/follow-up/supplemental on-platform advertisement. Of course, pricing of the related/follow-up/supplemental on-platform advertisement may be varied (e.g. increased, etc.) to reflect the effectiveness of such sequential targeted advertisements across multiple platforms. Still yet, off-platform advertisements may be bid upon, since there often is a single advertisement impression opportunity in connection with the user as he/she passes from location/context to location/context.

Even still, the service network may also establish policies to regulate the issues that may arise when providing on- and off-platform advertisements. Just by way of example, the service network may preclude the triggering of both an on- and off-platform advertisement to the same person at the same time.

In still other embodiments, the off-service network platform advertisements may be displayed in connection with an application that is initiated, accessible, etc. via an application associated with the service network. As an option, any enabling off-platform advertisement techniques (e.g. sharing of user information) and/or the display of off-platform advertisements themselves may be conditioned on the user authorizing the same. For that matter, any technique disclosed herein may be subject to such user authorization.

Figure 5:
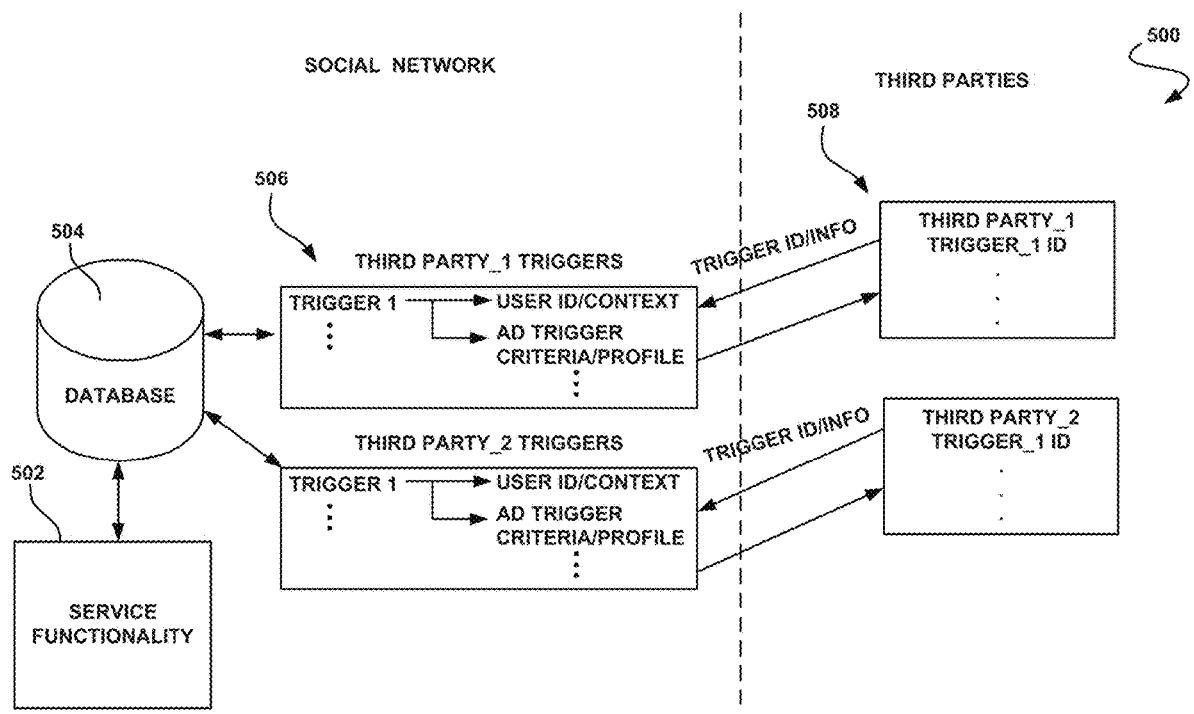
FIG. 5 shows a system for presenting advertisements/content, in accordance with another embodiment.

FIG. 5 shows a system 500 for presenting advertisements/content, in accordance with another embodiment. As an option, the system 500 may be implemented in the context of the architecture and environment of the previous Figures and/or any subsequent Figure(s). Of course, however, the system 500 may be implemented in the context of any desired environment. It should also be noted that the aforementioned definitions may apply during the present description.

As shown, a social network system may be in communication with one or more third party systems. In one embodiment, the social network system may include service functionality 502 that is in communication with one or more databases 504. It should be strongly noted that, while a social network system is provided in the present embodiment, any service network system may be substituted therewith.

The social networking service functionality may include any online service, platform, or site the helps facilitate the building of social networks or social relations among people, groups, and/or businesses, etc., who, for example, share interests, activities, backgrounds, or real-life connections. In various embodiments, the social network service may include a representation of each user (e.g. a profile, etc.), social link information, and a variety of additional services. In one embodiment, the social network service may be web-based and may allow for users to interact over the Internet, such as e-mail and instant messaging.

In one embodiment, the social network service functionality may allow a profile to be generated from a user answering to questions, such as age, location, interests, etc. In one embodiment, the social networking service functionality may allow the upload of pictures, multimedia content, and/or modification of the look and feel of the profile. Further, in one embodiment, the social network service functionality may allow users to enhance their profile by adding modules or applications.

In one embodiment, the social network service functionality may allow users to post blog entries, search for others with similar interests, and compile and share lists of contacts. Additionally, in one embodiment, the user profiles may have a section dedicated to comments from friends and other users. Further, in one embodiment, to protect user privacy, the social network service functionality may offer controls that allow users to choose who can view their profile, contact them, add them to their list of contacts, etc.

In another embodiment, the social network service functionality may allow the user to create groups that share common interests or affiliations, upload or stream live videos, and/or hold discussions in forums. Further, in one embodiment, the social network service may implement geo-social networking that co-opts Internet mapping services to organize user participation around geographic features and their attributes.

In one embodiment, the social networking service may include a time and/or a location based social network. More information regarding location based applications may be found in U.S. Provisional Patent Application No. 61/511,750, filed Jul. 26, 2011, titled "SYSTEM, METHOD, AND COMPUTER PROGRAM PRODUCT FOR MANAGING A SOCIAL NETWORK BASED ON AT LEAST A TIME OR A LOCATION," and U.S. patent application Ser. No. 13/557,198, filed Jul. 24, 2012, titled "SYSTEM, METHOD, AND COMPUTER PROGRAM PRODUCT FOR MANAGING A SOCIAL NETWORK BASED ON AT LEAST A TIME OR A LOCATION," which are incorporated herein by reference in their entirety.

In one embodiment, the social network system (or, again, any service network) may utilize information known about users of the social network to generate advertisement/content suggestions and/or trigger IDs. In another embodiment, another system may utilize information known about users of the social network to generate advertisement/content suggestions and/or trigger IDs (e.g. the social network system may share the information, etc.). For example, social network information about a first user of the social network system may be utilized to determine one of more advertisements/content to display to the first user. In one embodiment, information in addition to the social network information may be utilized (e.g. user information provided by a retailer, etc.).

In another embodiment, the social network system may associate users with advertisement/content trigger IDs. For example, based on user information associated with the social network, the user may be associated with one or more third party advertisement/content trigger IDs 506. In one embodiment, users with similar information may be associated with one or more of the same trigger IDs.

In one embodiment, the trigger IDs may be sent to one or my third party systems 508 in real-time. Further, in one embodiment, the third party system may utilize the trigger IDs (and/or information associated therewith, etc.) to select one or more advertisements/content to be presented to one or more users associated with the trigger IDs. To accomplish this, a data structure may be utilized to link the trigger IDs and the associated with specific advertisements/content (e.g. advertisement content, etc.) such that the latter may be looked up utilizing the former.

For example, in one embodiment, the first user of the social networking site may log onto an online retailer. In this case, in one embodiment, the social network system may send advertisement/content trigger IDs associated with the first user to the online retailer (or an advertiser, etc. associated with the online retailer, etc.), such that the online retailer (or an advertiser, etc. associated with the online retailer, etc.) may select one or more advertisements/content to display to the first user (e.g. on a portion of a web page associated with the online retailer, etc.).

While, in the foregoing embodiment, the advertisements/content may be displayed to the first user via a web page, it should be noted that the trigger IDs may be used to display the advertisement/content in connection with any application, display, device, etc. separate from the service network interface. Further, in any embodiment disclosed herein, the advertisement(s) itself may be sent in lieu of (or in addition to) the trigger ID(s).

In one embodiment, the third party may have one or more advertisements/content associated with the trigger IDs. In this way, in one embodiment, the third party may identify an advertisement opportunity (e.g. by ascertaining one of the aforementioned user identifying aspects which correlates to a user, etc.), query the social network system for a trigger ID (e.g. that is determined by the service network by matching profile criteria known about the user (as identified by the user identifying aspect) with profile criteria associated with one of the trigger IDs/associated advertisements), receive the trigger ID, and display one or more advertisements associated with the trigger ID.

As mentioned above, in one embodiment, the third party may query the social network system with user information (e.g. a username, a name, an alias, a user ID, a user email address, an application/location identifier, unique user context identifier, cookie, and/or any of the aforementioned user identifying aspects, etc.). Specifically, the service network may track any identifying aspect of the user (e.g. anonymously or otherwise, etc.) so that such identifying aspect can be included with a profile-related query (e.g. to determine an appropriate advertisement/content, if any) for display in connection with the user.

In another embodiment, the social network system may send information associated with one or more social network users to the third party system, such that the third party system may select targeted advertisements to display to the user. In one embodiment, the user of the social network system may have an option to allow sharing of information between the third party system and the social network system. Further, in one embodiment, the user may be incentivized to allow sharing between the third party system and the social network system. In various embodiments, the user may be incentivized by receiving discounts, receiving credits (e.g. store credit, etc.), receiving free items, receiving money, and/or utilizing various other incentives.

More information regarding sharing information between a social networking system and a third party system, etc. may be found in U.S. Provisional Patent Application No. 61/591,819, filed Jan. 27, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION;" and U.S. Provisional Patent Application No. 61/596,174, filed Feb. 7, 2012, titled "SYSTEM, METHOD, AND COMPUTER PROGRAM PRODUCT FOR ALTERING AT LEAST ONE ASPECT OF AN INTEGRATED E-COMMERCE ON-LINE APPLICATION."

Further, in one embodiment, the third party system may select advertisements to be displayed on a website associated with the social network system. For example, in one embodiment, information associated with the third party may be shared with the social network system, such that advertisements are presented to the user while the user is utilizing a social networking site. Additionally, in one embodiment, the advertisements/content selected may be presented on a third party display (e.g. at a business, on a billboard, etc.).

Still yet, in one embodiment, the social networking system may provide information (e.g. user information, trigger IDs, etc.) to company advertisers and/or other related-third party advertisers to trigger advertisements. More information about providing dynamic advertisements may be found in U.S. Provisional Patent Application No. 61/590,764, filed Jan. 25, 2012, titled "SYSTEM, METHOD, AND COMPUTER PROGRAM PRODUCT FOR PRESENTING INFORMATION TO A USER BASED ON DETERMINED SATISFACTION-RELATED INFORMATION ASSOCIATED WITH THE USER," which is incorporated herein by reference in its entirety.

In one embodiment, administrators associated with the third party systems may be capable of configuring and/or registering advertisement/content triggers and/or associated content/trigger IDs. In one embodiment, the social network system may provide a GUI for configuring such triggers and/or advertisements. In another embodiment, an advertisement system may provide a GUI for configuring such triggers. In yet another embodiment, the third party system owner may have control over a GUI for configuring advertisement/content triggers.

Figure 6:
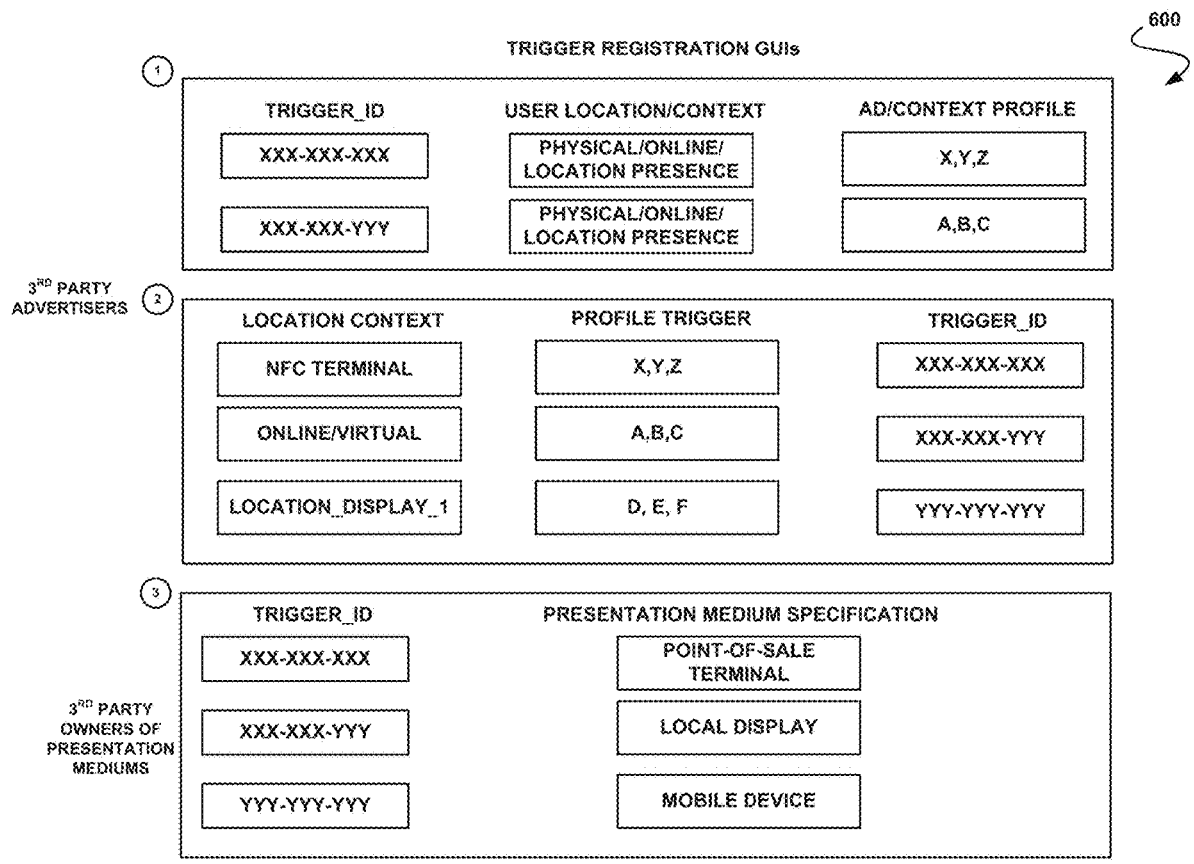
FIG. 6 shows exemplary interfaces for configuring and/or registering advertisement/content triggers, in accordance with another embodiment.

FIG. 6 shows exemplary interfaces 600 for configuring and/or registering advertisement/content triggers, in accordance with another embodiment. As an option, the interfaces 600 may be implemented in the context of the architecture and environment of the previous Figures and/or any subsequent Figure(s). Of course, however, the interfaces 600 may be implemented in the context of any desired environment. It should also be noted that the aforementioned definitions may apply during the present description.

As shown, an advertiser may utilize one or more of the interfaces 600 to configure various aspects associated with triggering and/or displaying targeted advertisements/content. In the context of the present description, an advertiser refers to any entity aspiring to present a product, service, and/or incentive to one or more other entities (e.g. people, businesses, etc.).

As shown in interface 1, the advertiser may have the ability to associate a trigger ID with one or more advertisement/context profiles. In one embodiment, the one or more advertisement/context profiles may be associated with one or more advertisements/content that has been designed to target (or is logically attributable) to a particular demographic or desired audience (e.g. males in their 30s, female homemakers, children, parents, dog owners, etc.). Accordingly, in one embodiment, a trigger ID may be associated with profile criteria that is, in turn, associated with one or more of the advertisements targeted towards a specific demographic. In this way, in one embodiment, social network systems (and/or other service systems) may utilize user information to associate trigger IDs with users, such that when a specific user is available for a third party advertisement opportunity, the associated trigger ID may be sent to the third party service, and an appropriate advertisement/content profile may be selected and presented, based on the trigger ID.

Further, in one embodiment, a location and/or context in which the advertisement is to be presented may be specified. For example, in various embodiments, an advertiser may have the ability to specify that the advertisements/content associated with the advertisement/content profile are presented at a physical display (e.g. a specific physical display, a display determined to be in proximity to the user, etc.), online (e.g. on a portion of a web page being viewed by the user, on a portion of a web page associated with the third party, on a portion of a web page associated with a social networking site, etc.), on a mobile device associated with the user (e.g. via a specific screen, via a specific application, etc.), any of the device(s) disclosed in the description of FIG. 4, and/or based on a location of the user.

In the case that the advertiser desires to present the advertisement/content based on a location of the user, in one embodiment, the advertisement/content may be presented on available displays, which are determined to be in the proximity of the user (e.g. a store display, a point-of-sale terminal, etc.). In one embodiment, if the advertiser desires to present the advertisement/content based on a location of the user, in one embodiment, the display in which to present the advertisement will be selected upon determination that the specific user is a specific location (e.g. and/or upon another triggering event, etc.).

As shown in interfaces 2 and 3, in one embodiment, the advertiser may be presented with specific location context options for advertisement/content presentation. For example, in various embodiments, the advertiser may specify that the advertisement be presented at an NFC terminal, online, a mobile device associated with the user, a specific location display, a general area location display, a point-of-sale terminal, a specific website, a general website, and/or various other displays. Furthermore, in one embodiment, the location presentation options may be configurable such that they are different for each trigger ID.

Specifically, in one embodiment in connection with interfaces 2 and 3, a specific display may be specifically identified (e.g. utilizing an IP, GPS, or other destination address, etc.) and even given an alias (e.g. "Discount Store Sports Department Display #1," etc.) such that a plurality of triggering profile criteria sets (each with a plurality of correlating trigger IDs) may be defined and associated with such specific display. Further, in the event that multiple displays are being enabled, the same or different triggering profile criteria sets/trigger IDs may be easily replicated (and possibly modified) for each of the different displays. To this end, the system may be configured such that, in connection with each display, a user identifying aspect may be sent to the service network (in connection with the specific display), such that the user profile criteria and advertisement target profile criteria can be used to cause display of the most relevant advertisement/content to the user via the specific display where he/she has been identified. Yet again, while physical displays are exemplified in the current embodiment, it should be noted that the display may be the same display with which the service network is accessed, but possibly in a different context (e.g. during use of a separate application, during downtime, etc.).

Figure 7:
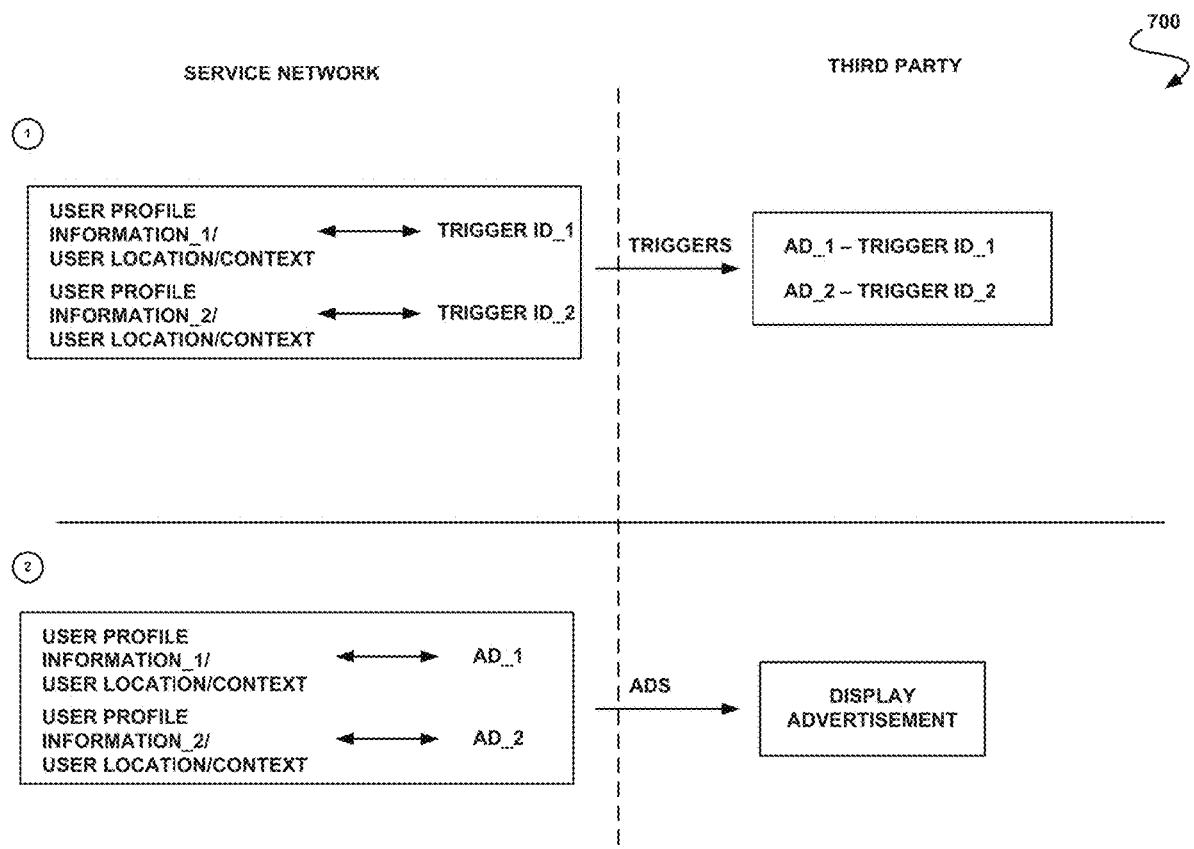
FIG. 7 shows a system flow for presenting advertisements, in accordance with another embodiment.

FIG. 7 shows a system flow 700 for presenting advertisements, in accordance with another embodiment. As an option, the system flow 700 may be implemented in the context of the architecture and environment of the previous Figures and/or any subsequent Figure(s). Of course, however, the system flow 700 may be implemented in the context of any desired environment. It should also be noted that the aforementioned definitions may apply during the present description.

As shown, a service network system may associate user profile information, user location information, and/or contextual information with one or more advertisement/content trigger IDs. For example, in one embodiment, the service network system may utilize relevant information associated with a user to characterize the user such that advertisements/content may be targeted towards that user, based on the characterization. In this way, the service network system may utilize a vast amount of information the system has compiled about the user to more accurately characterize and/or categorize the user, for the purposes of more appropriately targeting advertisements/content. In one embodiment, the relevant profile information may be utilized to associate a trigger ID with the user. In one embodiment, the trigger ID may be associated with one or more advertisements/content that are considered to be relevant to the user.

Further, in one embodiment, user location information may be included and/or linked to the trigger ID. In one embodiment, the user location information may include current user location information. For example, in various embodiments, the current user location may be determined based on a user check-in, a mobile phone signal, a user communication (e.g. a user post, etc.), GPS coordinates, a network signal, a Bluetooth signal, and/or by utilizing various other techniques.

In another embodiment, the location information may include a residence location associated with the user. In another embodiment, the location information may include a business location associated with the user. In another embodiment, the location information may include a shopping location associated with the user. In another embodiment, the location information may include a virtual location associated with the user (e.g. a website, etc.).

Further, in one embodiment, the trigger ID may be associated with a context. In various embodiments, the context may include situations in which the advertisement/content is to be displayed, a time period in which the advertisement/content is to be displayed (or an expiration time, etc.), an event that is to occur before advertisement/content is to be displayed, and/or any other context in which the advertisement is to be displayed.

In one embodiment, the advertiser (and/or the service network, etc.) may have the ability to configure rules associated with the context. In one embodiment, the advertiser (and/or the service network, etc.) may have the ability to configure rules associated with the context utilizing one or more interfaces (e.g. the interfaces of FIG. 6, etc.). In various embodiments, the configurable rules may include configuring a number of times an advertisement/content is displayed to a particular user, a number of times an advertisement/content is displayed to all users, a time of day the advertisement/content is capable of being displayed, a location in which the advertisement/content is permitted to be displayed (e.g. a geographic location, a specific display location, a business location, etc.), a demographic that is capable of viewing the content/advertisement, criteria that must be true for the advertisement/content to be presented, events that must occur before the advertisement/content is presented (e.g. the user must purchase a specific item, the user must check-out at a store, etc.), and/or any other rule that may be utilized to establish a context.

Furthermore, in one embodiment, the triggers IDs, which are associated with the information, may be associated with one or more advertisements. In one embodiment, the service network system may associate the trigger ID with the advertisement(s). In another embodiment, the third party system may associate the trigger ID with the advertisement(s). For example, knowing what demographic, users, groups, and/or types of users in which the trigger IDs are associated, the advertisements/content that should be directed to those users (e.g. based on market research, etc.) may be selected and associated with the trigger IDs.

Accordingly, in one embodiment, when an apparatus associated with the third party determines that a user is present (e.g. at a point-of-sale terminal at check-out, etc.), information associated with the user may be sent from the third party (e.g. a name, an ID, a captured image, a username, etc.) such the service network may identify an associated trigger ID (or associate the user with a trigger ID, etc.). In one embodiment, the identified (or determined) trigger ID associated with the user may be communicated to the third party system (along with any other information, such as context, etc.). In response, in one embodiment, the third party system may utilize the trigger ID (as well as any other information accompanying the trigger ID, such as context, etc.) to select one or more advertisements to display to the user.

In another embodiment, the service network system may identify the location of the user (e.g. based on GPS coordinates, based on a user check-in, based on a check-out, etc.) and send a trigger ID to the third party system such that the advertisement/content may be selected and displayed. In still another embodiment, the service network may send advertisements/content to the third party system. For example, in one embodiment, the user may be identified and one or more advertisements may be selected by the service network system and sent to the third party system. In this case, in one embodiment, the third party system may display the advertisement received from the service network system. In one embodiment, the service network system may access an advertisement database to select an advertisement to send to the third party system.

Figure 8:
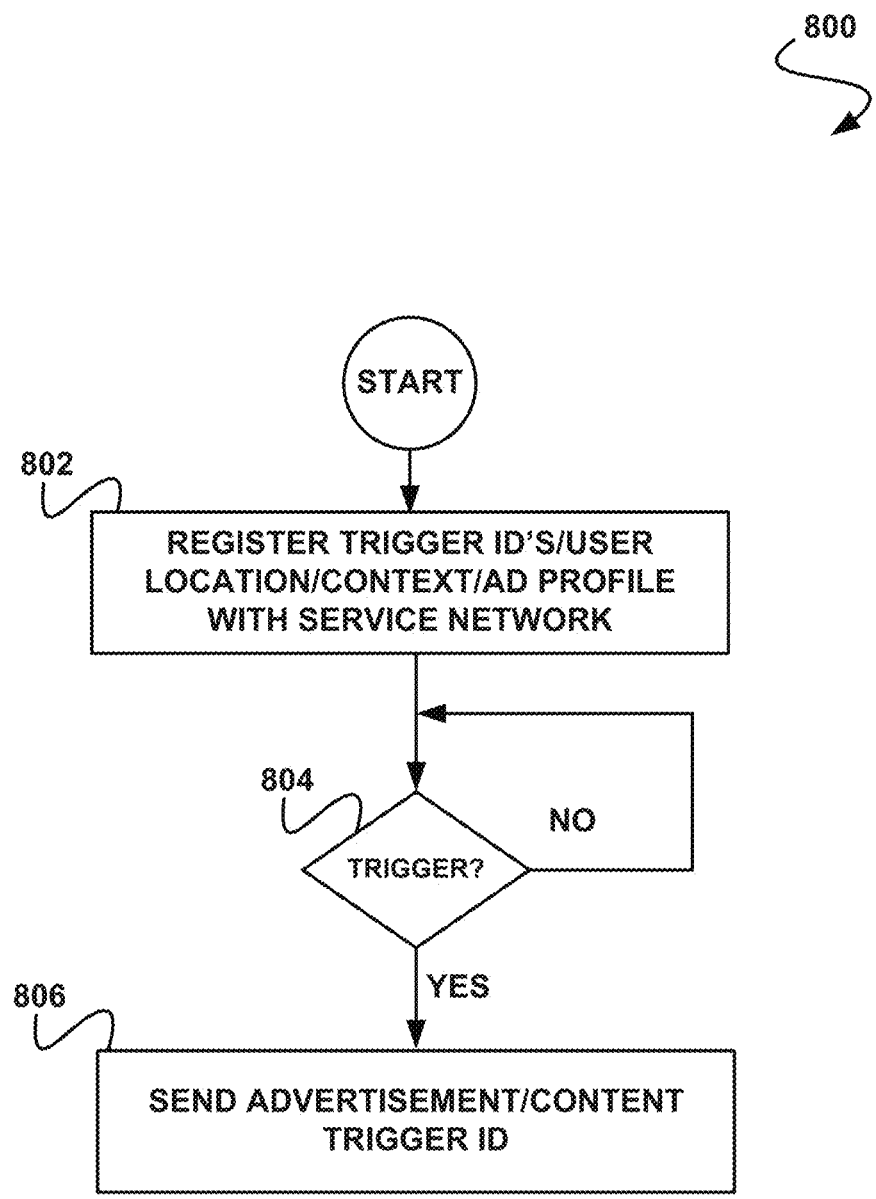
FIG. 8 shows a method for communicating advertisement/content trigger IDs, in accordance with one embodiment.

FIG. 8 shows a method 800 for communicating advertisement/content trigger IDs, in accordance with one embodiment. As an option, the method 800 may be implemented in the context of the architecture and environment of the previous Figures and/or any subsequent Figure(s). Of course, however, the method 800 may be carried out in any desired environment. It should also be noted that the aforementioned definitions may apply during the present description.

As shown, trigger IDs are registered with a service network. See operation 802. In one embodiment, a context, user location information, and advertisement profiles may also be registered with the service network and may be associated with a trigger ID. Of course, any of the trigger IDs and associated advertisement profile criteria and/or user profile criteria (as disclosed herein) may be registered in operation 802.

Further, it is determined whether a trigger event has occurred. See decision 804. In one embodiment, the service network may determine whether the trigger event has occurred. In another embodiment, a third party system may determine whether the trigger event has occurred. In one embodiment, the third party system may determine that the trigger event has occurred and may notify the service network system (e.g. by requesting an advertisement, by requesting a trigger ID, by sending user information, etc.).

The trigger event may include any type of trigger event. For example, in one embodiment, the trigger event may include a device recognizing the face of the user. In another embodiment, the trigger event may include the user scanning a loyalty card. In another embodiment, the trigger event may include the user swiping a credit card. In another embodiment, the trigger event may include the user initiating a mobile wallet payment. In another embodiment, the trigger event may include the user scanning an item.

In another embodiment, the trigger event may include the user checking in to a location. In another embodiment, the trigger event may include the user checking out at a store. In another embodiment, the trigger event may include the user requesting an advertisement/content. In another embodiment, the trigger event may include the user visiting a website (e.g. a particular website, etc.).

In another embodiment, the trigger event may include the user selecting an item on a web page. In another embodiment, the trigger event may include the user purchasing a particular item (or any item, etc.). In another embodiment, the trigger event may include the user performing a designated action on a point-of-sale terminal (e.g. selecting a particular button, etc.). In another embodiment, the trigger event may include the user performing a specific action on a mobile device (e.g. accessing a particular application, utilizing mobile payment functionality, etc.).

In another embodiment, the trigger event may include receiving a signal from a mobile device of the user. In another embodiment, the trigger event may include a determination that the user is in or near a particular location. In another embodiment, the trigger event may include the user accessing a particular network (e.g. a particular wireless network, etc.). In another embodiment, the trigger event may include receiving a text including keywords. In another embodiment, the trigger event may include receiving an e-mail including keywords.

In another embodiment, the trigger event may include receiving a voicemail including keywords. In another embodiment, the trigger event may include a calendar event. In another embodiment, the trigger event may include a media event. In still other embodiments, the trigger event may occur as a function of the identification of any of the user identifying aspect(s) disclosed hereinabove. Of course, in various embodiments, the trigger event may include any type of event.

If it is determined that a trigger event has occurred, the advertisement/content trigger ID is sent to the third party system. See operation 806. In one embodiment, the advertisement may be sent to the third party system in response to the trigger event.

As noted, in one embodiment, the trigger event may include a user implementing a transaction utilizing a mobile device.

Figure 9:
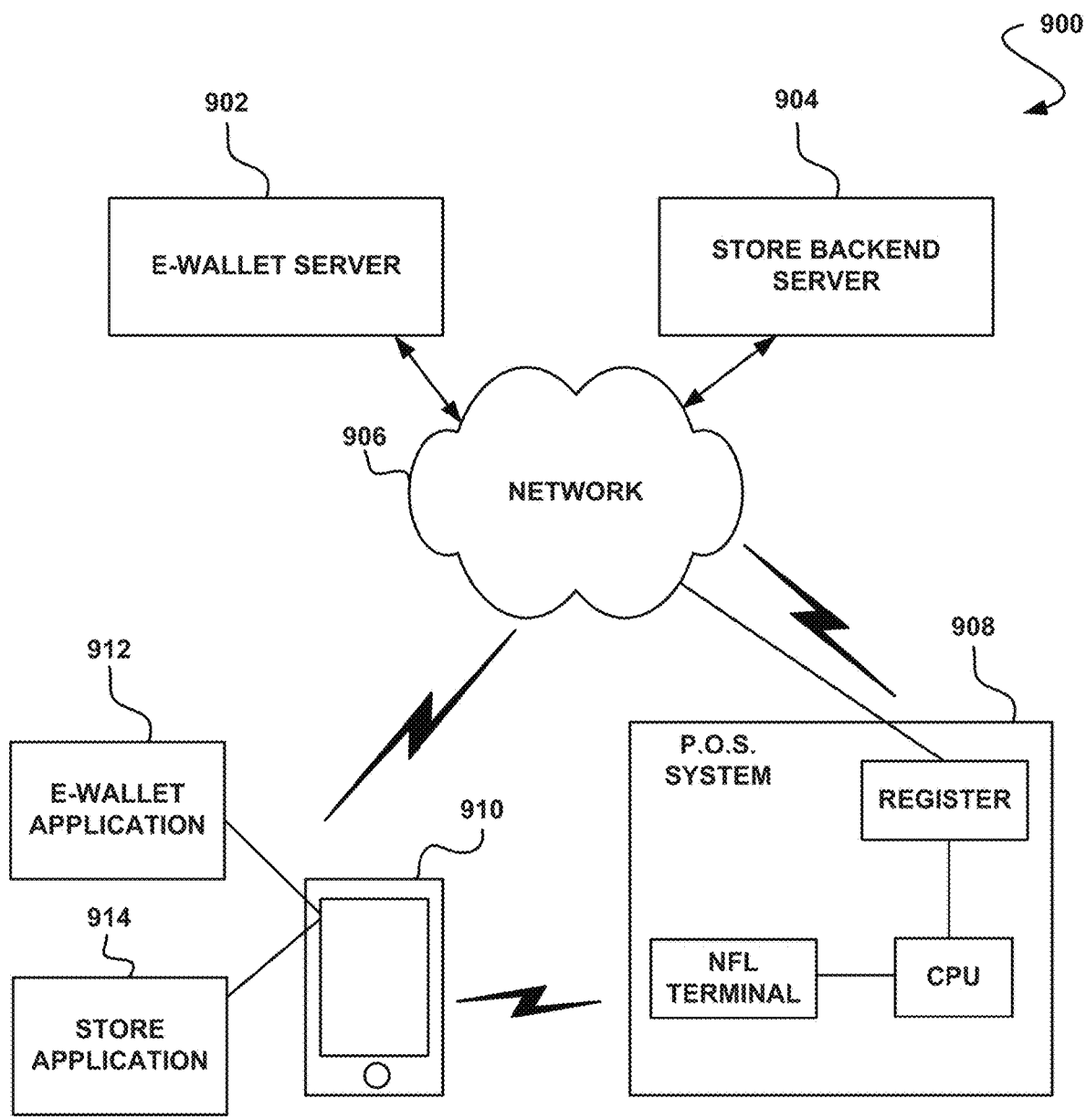
FIG. 9 shows a system for mobile device transactions, in accordance with another embodiment.

FIG. 9 shows a system 900 for mobile device transactions, in accordance with another embodiment. As an option, the system 900 may be implemented in the context of the architecture and environment of the previous Figures and/or any subsequent Figure(s). Of course, however, the system 900 may be implemented in the context of any desired environment. It should also be noted that the aforementioned definitions may apply during the present description.

As shown, an e-wallet server 902 may be in communication with one or more mobile devices 910 and one or more point-of-sale systems 908 over one or more networks 906. Furthermore, in one embodiment, one or more store backend servers 904 may be in communications with the e-wallet server 902, the mobile device 910, and/or the point-of-sale terminal 908.

In operation, a user of the mobile device 910 may initiate a transaction utilizing the mobile device 910 and the point-of-sale terminal 908. In one embodiment, an NFC connection between the mobile device 910 and the point-of-sale terminal 908 may be utilized to facilitate the transaction. In another embodiment, a Wi-Fi direct connection between the mobile device 910 and the point-of-sale terminal 908 may be utilized to facilitate the transaction.

In another embodiment, an IR connection between the mobile device 910 and the point-of-sale terminal 908 may be utilized to facilitate the transaction. In another embodiment, a Bluetooth connection between the mobile device 910 and the point-of-sale terminal 908 may be utilized to facilitate the transaction. In another embodiment, bump technology implemented between the mobile device 910 and the point-of-sale terminal 908 may be utilized to facilitate the transaction.

In another embodiment, the transaction between the mobile device 910 and the point-of-sale terminal 908 may be facilitated over the network 906 (or another network, the Internet, etc.). In another embodiment, information displayed on the mobile device 910 may be scanned by the point-of-sale terminal 908 to facilitate the transaction. Of course, in various embodiments, any suitable technology may be utilized to facilitate the transaction.

In operation, in one embodiment, the user may utilize an e-wallet application 912, which is stored on the mobile device 910 to facilitate payment of goods and/or services. In one embodiment, the e-wallet application 912 may enable communication between the mobile device 910 and the e-wallet server 902. In one embodiment, the e-wallet server 902 may include service functionality for enabling a transaction to occur between the user of the mobile device 910 and a store associated with the point-of-sale terminal and/or the store backend server 904.

For example, a user may proceed to checkout at a point-of-sale terminal at a grocery store. In one embodiment, the mobile device 910 may be utilized to communicate store loyalty card information to the point-of-sale terminal 908. In one embodiment, a store application 914, which may be stored on the mobile device 910, may be utilized to facilitate the transfer of the store loyalty card information. In another embodiment, the e-wallet application 912 may be utilized to facilitate the transfer of the store loyalty card information.

Further, in one embodiment, the user may utilize the e-wallet application 912 stored on the mobile device 910 to pay for items. In one embodiment, the e-wallet application 912 may include credit card information associated with the user, such that the credit card may be utilized automatically to pay for the items. In another embodiment, the e-wallet application 912 may include pre-paid card information associated with the user, such that the pre-paid card may be utilized automatically to pay for the items. In another embodiment, the e-wallet application 912 may include bank card information associated with the user, such that the bank card may be utilized automatically to pay for the items. In another embodiment, the e-wallet application 912 may include bank account information associated with the user, such that the bank account information may be utilized automatically to pay for the items. In one embodiment, a user may have the ability to choose a default payment method from a list of available payment methods.

In one embodiment, transaction details may be displayed on the mobile device 910 and/or on a display associated with the point-of-sale system 908. For example, in one embodiment, upon finalization of the transaction, transaction information may be displayed on the mobile device. In one embodiment, the transaction information may be displayed utilizing the e-wallet application 912.

In another embodiment, the transaction information may be displayed utilizing the store application 914. In another embodiment, the transaction information may be displayed utilizing another application stored on the mobile device 910. Further, in one embodiment, the transaction information may be displayed on a lock screen of the mobile device 910. In one embodiment, such transaction information may be displayed in a non-intrusive manner. In various embodiments, the transaction information may include a cost (e.g. a total cost, a cost per item, a cost of sales tax, an itemized price list, etc.), a list of purchased items/services, a time of purchase, product names, product codes, a method of payment, one or more of the transaction parties, and/or any other transaction related information.

Still yet, in one embodiment, the transaction may serve as trigger event for displaying advertisements on the point-of-sale terminal 908 and/or the mobile device, as described in the context of the previous figures and subsequent figures (such as FIG. 13), etc. In one embodiment, the advertisements may be displayed on the mobile device 910 and/or the point-of-sale terminal 908 in a non-intrusive manner.

More information about non-intrusively displaying advertisements on a mobile device may be found in U.S. Provisional Patent Application No. 61/711,727, filed Oct. 9, 2012, titled "SYSTEM, METHOD, AND COMPUTER PROGRAM PRODUCT FOR DETERMINING WHETHER TO PROMPT AN ACTION BY A PLATFORM IN CONNECTION WITH A MOBILE DEVICE," which is incorporated herein by reference in its entirety.

Figure 10:
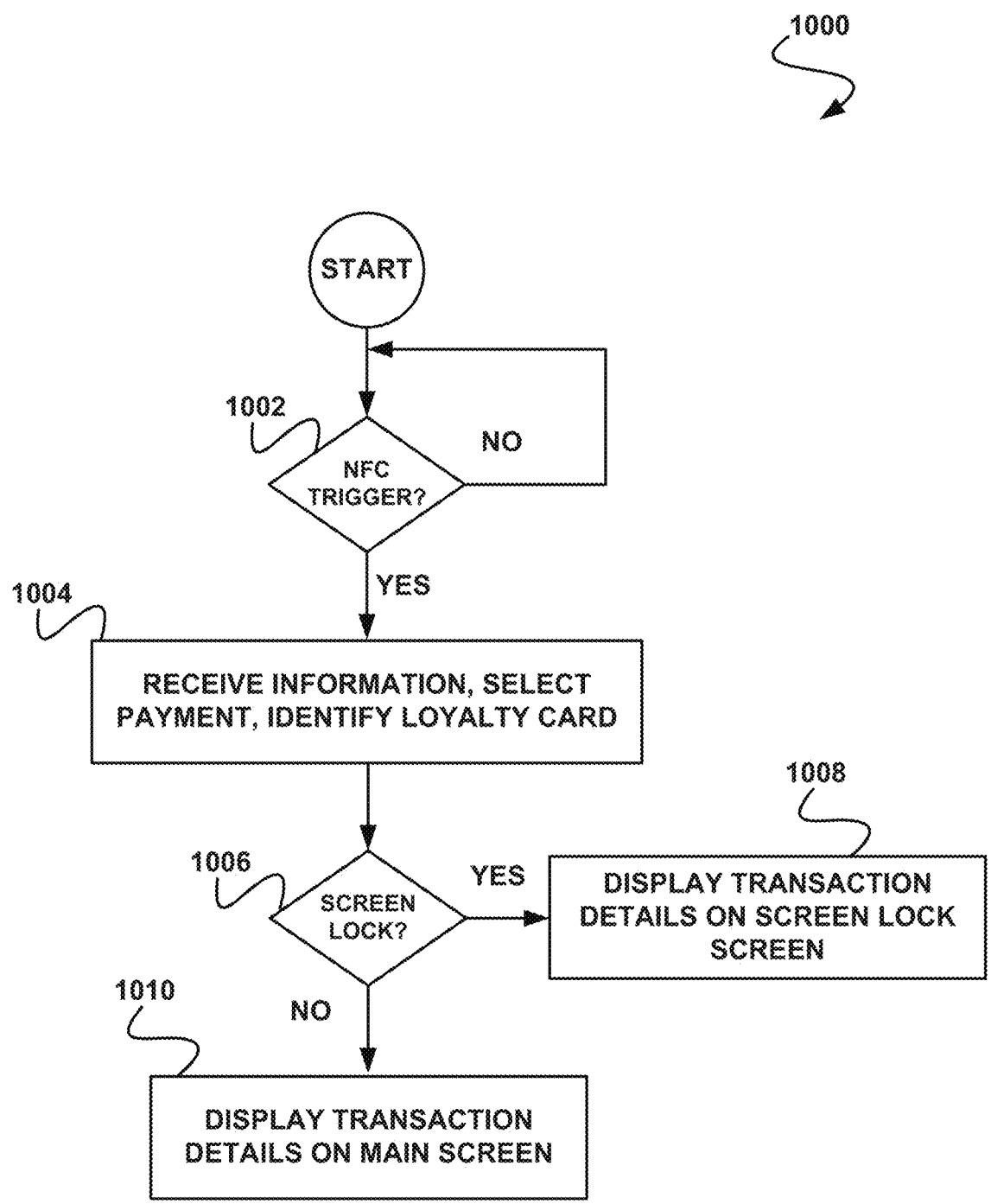
FIG. 10 shows a method for a mobile device transaction, in accordance with another embodiment.

FIG. 10 shows a method 1000 for a mobile device transaction, in accordance with another embodiment. As an option, the method 1000 may be implemented in the context of the architecture and environment of the previous Figures and/or any subsequent Figure(s). Of course, however, the method 1000 may be carried out in any desired environment. It should also be noted that the aforementioned definitions may apply during the present description.

As shown, it is determined whether an NFC trigger is received by a mobile device (or an application associated therewith). See determination 1002. While a NFC trigger is disclosed in the context of operation 1002, it should be noted that any connection mechanism (e.g. see those, for example, disclosed during the description of FIG. 9, etc.) may be used in lieu of NFC.

If a trigger is received in operation 1002, information associated with the transaction is received, a payment method is selected (e.g. a card is selected, etc.), and a loyalty card is identified. See operation 1004.

In one embodiment, the information received may include transaction information. In various embodiments, the transaction information may include a price, credit card information, loyalty information, product information, store information, time information, location information, discount information, method of purchase information, and/or any other type of transaction-related information.

In various embodiments, the payment method may include a credit card (or a credit card number), a debit card, a prepaid card, bank account information, and/or any other payment type. In one embodiment, the payment method may be manually selected by the user at the time of completing the transaction. Further, in another embodiment, the payment method may be automatically selected (or at least suggested) based on any criteria. Such criteria may include or be based, at least in part, on a current location (e.g. based on a GPS location, etc.), a point-of-sale terminal used, on a signal received (e.g. that indicates which payment method types are acceptable), the type of payment method last used (in general, or at the current location), a balance of an account associated with the payment method (that is sufficient to cover the cost of the transaction), etc.

Still yet, in operation 1004, a loyalty card may be identified. For example, such loyalty card may be automatically selected. In various embodiments, the loyalty card may be selected based on a current location (e.g. based on a GPS location, etc.), based on a point-of-sale terminal used, based on a signal received, and/or utilizing various other techniques. In another embodiment, the loyalty card may be manually selected by the user of the mobile device.

Further, it is determined whether a screen of the mobile device is locked. See determination 1006. If it is determined that the screen is locked, the transaction details are displayed on the screen lock screen of the mobile device. See operation 1008. If it is determined that the screen is not locked, the transaction details are displayed on the main screen of the mobile device. See operation 1010.

While not necessarily illustrated, it may or may not be determined whether the mobile device is in a standby mode in determination 1006. If it is determined that the mobile device is in a standby mode, the mobile device may be powered up and/or taken out of the standby mode before the transaction details are displayed on the screen lock screen of the mobile device in operation 1008.

In the event that the transaction details are displayed on the main screen of the mobile device per operation 1010, an application (e.g. e-wallet, etc.) installed on the mobile device (that is capable of facilitating the transaction) may be automatically executed and opened, such that the main screen is populated (possibly entirely or substantially so) by an interface of the aforementioned application.

While not shown, in the event that a transaction is completed via the lock screen in operation 1008, an option may be given thereafter to execute and open a relevant interface (e.g. post-transaction interface) of the foregoing application for engaging in post-transaction functionality (e.g. examples of which will be set forth hereinafter in greater detail). Further, absent electing such option, the mobile device may either stay in lock screen mode for a predetermined period and thereafter return to the power standby mode, or immediately return to the power standby mode.

In one embodiment, one or more advertisements may be displayed on the lock screen of the mobile device (and/or the main screen, as well). Further, in one embodiment, advertisements may be displayed on the mobile device based on a location of the mobile device.

Again, it should be noted that, although the method 1000 refers to an NFC trigger, any communication protocol connection may be utilized as a trigger in another embodiment.

Figure 11:
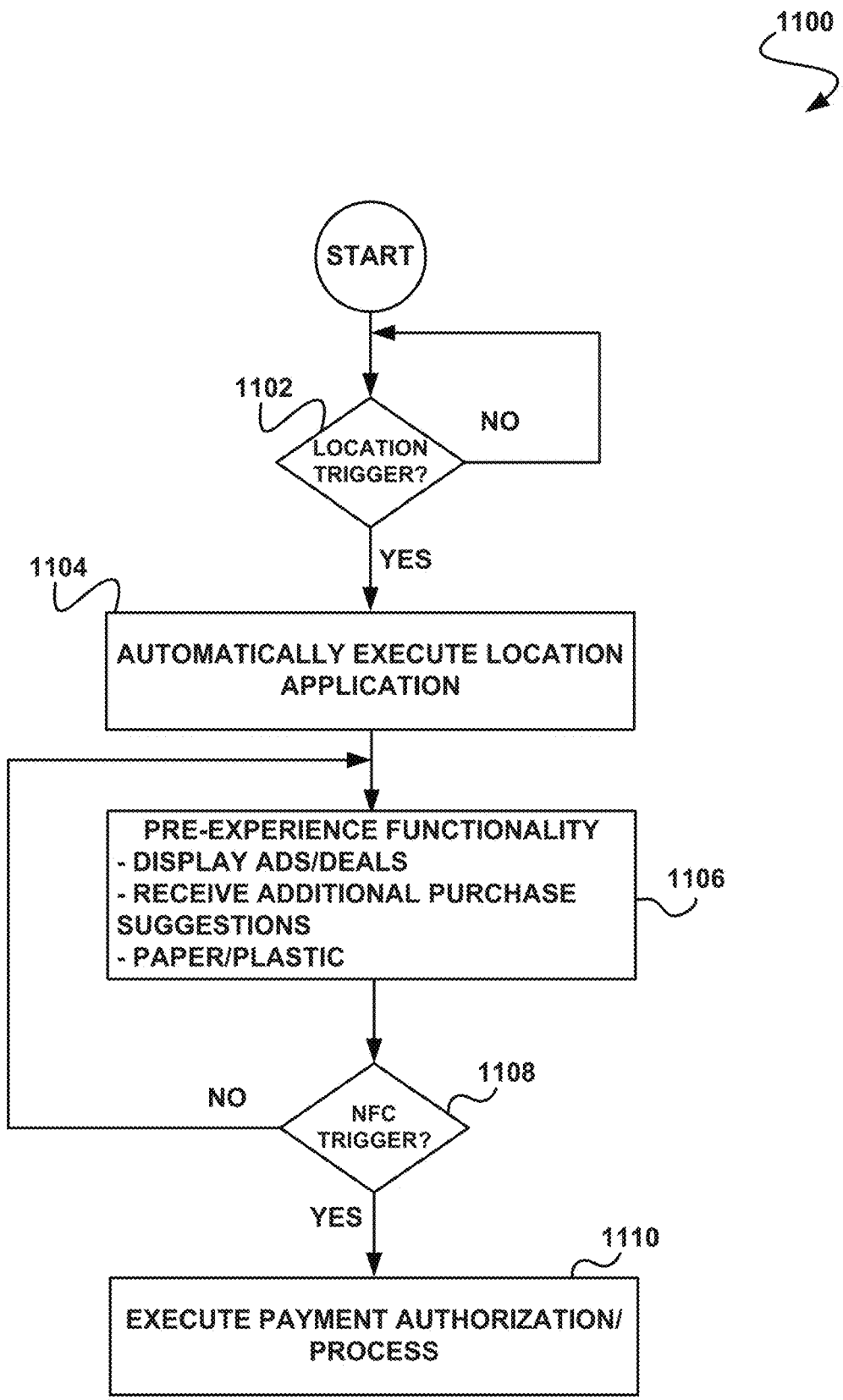
FIG. 11 shows a method for a mobile device transaction, in accordance with another embodiment.

FIG. 11 shows a method 1100 for a mobile device transaction, in accordance with another embodiment. As an option, the method 1100 may be implemented in the context of the architecture and environment of the previous Figures and/or any subsequent Figure(s). Of course, however, the method 1100 may be carried out in any desired environment. It should also be noted that the aforementioned definitions may apply during the present description.

As shown, it is determined whether a location trigger is received by a mobile device. See determination 1102. In one embodiment, the location trigger may include any of the user identifying aspects set forth hereinabove during the description of FIG. 4. In other embodiments, the location trigger may include any trigger associated with location determination. Further, the location of the user and/or the mobile device may be determined utilizing a variety of techniques.

For example, in one embodiment, the user may digitally check-in to a location and the location may be determined. In various embodiments, the user may check-in to the location utilizing the mobile device associated with the user, a system associated with the location, and/or another device. In one embodiment, the user may check in to a location utilizing an application stored on the mobile device of the user. In various embodiments, the application may include a social network application, an application associated with the location, a mapping application, a geo-caching application, and/or various other applications. In another embodiment, the user may check in to a location utilizing a check-in system associated with the location.

In another embodiment, the mobile device of the user may be utilized to automatically check in to a location. For example, in one embodiment, an application stored on the mobile device may be utilized to automatically check in to a location (e.g. based on a wireless signal, based on wireless network availability, based on GPS, a bump signal, an NFC signal, a Wi-Fi signal, etc.).

Further, in one embodiment, the location of the user and/or mobile may be determined based on GPS. For example, the mobile device (and/or an application/OS associated therewith) may share GPS data associated with the mobile device, such that the location of the mobile device/ user is determined. In one embodiment, the GPS data may be shared with the service network system. In another embodiment, the GPS data may be shared with one or more third party systems.

In another embodiment, the location of the user and/or the mobile device may be determined based on a signal provided by the mobile device of the user. For example, in one embodiment, the mobile device of the user may provide a Bluetooth signal that is capable of being received by a device associated with the location (e.g. a display, a computer, a location detection device, a point-of-sale device, etc.), such that location may be determined. In another embodiment, the mobile device of the user may provide a NFC signal that is capable of being received by a device associated with the location (e.g. a display, a computer, a location detection device, a point-of-sale device, etc.), such that location may be determined. In another embodiment, the mobile device of the user may provide a Wi-Fi signal that is capable of being received by a device associated with the location (e.g. a router, a display, a computer, a location detection device, a point-of-sale device, etc.), such that location may be determined. In another embodiment, the mobile device of the user may provide a chirp signal that is capable of being received by a device associated with the location, such that location may be determined. In one embodiment, the chirp signal may include information associated with the location (e.g. GPS coordinates, etc.). In one embodiment, a signal strength associated with the chirp may be used to associate the user with a location.

In another embodiment, the mobile device may be connected to a wireless network associated with the location automatically (or manually), such that a location may be determined. In still another embodiment, the location of the user may be determined utilizing facial recognition techniques. For example, in one embodiment, a system associated with the location may be utilized to determine the user is present based on facial recognition.

In another embodiment, the location of the user may be determined utilizing social network status associated with the user. In another embodiment, the location of the user may be determined based on an action of the user. For example, in one embodiment, the user may utilize the mobile device to scan a bar code of an item (e.g. a product, a poster, a billboard, etc.), such that the location of the user may be determined. In another embodiment, the user may utilize the mobile device to capture an image of an item (e.g. a building, a sign, a product, a poster, a billboard, etc.), such that the location of the user may be determined.

In another embodiment, the user may utilize the mobile device to facilitate a purchase at a location (e.g. utilizing an e-wallet application, utilizing a digital credit card, utilizing a digital debit card etc.), such that the location of the user may be determined. In another embodiment, the user may utilize a payment technique attributable to the user to facilitate a purchase at a location (e.g. utilizing gift card, utilizing a credit card, utilizing a debit card etc.), such that the location of the user may be determined. In another embodiment, the user may scan a loyalty card at a location, such that the location of the user may be determined. Of course, any technique may be utilized to determine a location associated with the user. Furthermore, in various embodiments, any location determination event may include receiving a location trigger.

If it is determined that a location trigger is received, a location application is automatically executed on the mobile device. See operation 1104. In one embodiment, the location application may include an application associated with a business (e.g. a business at the location, etc.). In another embodiment, the location application may include an application associated with an advertiser. In another embodiment, the location application may include an application associated with a mobile e-wallet application.

Once the location application is executed, in one embodiment, pre-experience functionality is implemented. See operation 1106. While the functionality of operation 1106 is set forth in the context of a location application that is triggered by a location trigger event, it should be noted that it is contemplated that operation 1106 may occur independent of location, as well, in other embodiments.

In one embodiment, the pre-experience functionality may include receiving advertisements/deals/coupons on the mobile device, a point-of-sale terminal display, and/or a display associated with the location. In one embodiment, the advertisements may include advertisements specifically targeted towards the user of the mobile device (e.g. as described in the context of the previous figures, etc.). Further, in one embodiment, the advertisements may include advertisements that are associated with the location (e.g. store advertisements associated with the location, product advertisements associated with the location, service advertisements associated with the location, etc.). Still yet, the aforementioned advertisements/deals/coupons may be specifically targeted as to the specific location of the user. For example, a user may receive a first advertisement for a first product in a first aisle if it is determined that the user is in the first aisle, a second advertisement for a second product in a second aisle if it is determined that the user is in the second aisle, and/or a third advertisement for a third product in a checkout line if it is determined that the user is in the checkout line.

Still yet, in one embodiment, deals and/or incentivized group discounts may be presented to the user. More information regarding group incentivized discounts may be found in U.S. Provisional Patent Application No. 61/590,767, filed Jan. 25, 2012, and titled "SYSTEM, METHOD AND COMPUTER PROGRAM PRODUCT FOR LOCATION-SPECIFIC PRIVACY SETTINGS."

Further, in one embodiment, the pre-experience functionality may include receiving additional purchase suggestions. For example, in one embodiment, a user may scan one or more items at a point-of-sale terminal, and initiate a payment utilizing the mobile device, such that the location is determined, the location trigger is received, and the location application is executed. In this case, in one embodiment, additional item suggestions may be made to the user for purchase, based on scanned items. In another embodiment, items may be suggested to the user based on previous purchases. In addition to basing suggestions on the foregoing, such suggestions may be made as a function of an accessibility of the product. For example, if the user is already in a check-out line, the suggestion product may be accessible from the check-out line. Of course, in various embodiments, items may be suggested to the user based on any techniques discussed herein. Additionally, in one embodiment, items may be suggested to the user based on determined interests. In one embodiment, the interests may be determined utilizing user information gleaned from service networks (e.g. a social media network, etc., as described herein, etc.).

More information regarding determining interests/habits of a user may be found in U.S. Provisional Patent Application No. 61/481,722, filed May 2, 2011, titled "SYSTEM, METHOD, AND COMPUTER PROGRAM PRODUCT FOR ALLOCATING TIME TO ACHIEVE OBJECTIVES;" and U.S. patent application Ser. No. 13/462,804, filed May 2, 2012, titled "SYSTEM, METHOD, AND COMPUTER PROGRAM PRODUCT FOR ALLOCATING TIME TO ACHIEVE OBJECTIVES," which are incorporated herein by reference in their entirety.

Further, in one embodiment, the pre-experience functionality may include determining whether the user desires to use paper or plastic bags. For example, in one embodiment, the user may be presented with the option to user paper or plastic bags on the mobile device. In one embodiment, selection of paper or plastic may cause the appropriate bag to be dispensed for use (e.g. utilizing an automatic dispenser, etc.). In one embodiment, the user may have the option to select a number of bags. In one embodiment, the user may be automatically charged for the bags, upon selection of the number of bags. In one embodiment, the user may be presented with the option to confirm the desire to purchase bags, on the mobile device.

In still another embodiment, the pre-experience functionality may include loyalty building by presenting the user with information regarding the relevant business, store, establishment, etc. For example, such functionality may provide access to an order menu for communicating a real-time order for a product (e.g. sandwich order, coffee order, etc.), current gift/store card balance, rewards, nutritional information, links to product websites, past purchase history, upcoming events, registration form for joining a loyalty program, product refill/replenishment suggestions that are a function of time/date-stamped past purchases and estimated/predetermined time-based (or other) thresholds that indicate when a refill/replenishment would likely be necessary, wish lists that allow a user to track their desired products and/or products that are desired by friends/family/colleagues of the user (as possibly indicated by links, information, etc. shared with the user), notes, etc.

As an option, in one possible embodiment, any of the pre-transaction experience functionality may be facilitated by way of the automatic execution of a business-specific application. In such embodiment, the business-specific application may be utilized to provide any of the pre-experience functionality set forth herein.

In one embodiment, the purchase may be capable of being facilitated utilizing NFC functionality between the mobile device and a point-of-sale terminal. In this case, it is determined whether an NFC trigger is received. See decision 1108. Of course, in other embodiments, any suitable technology may be utilized to facilitate the transaction (e.g. bump technology, Wi-Fi direct, Bluetooth, location, any of those mentioned hereinabove, etc.).

If it is determined that the NFC trigger is received, a payment authorization or process is executed. See operation 1110. In various embodiments, the payment authorization/ process may include credit card authorization, payment authorization, user verification/authentication, a user confirmation prompt, and/or various other processes. Further, as an option, such trigger automatically cease the pre-transaction experience and immediately present transaction information using any of the techniques disclosed herein. As a further option, in the event a user has engaged in any of the aforementioned pre-transaction experience, such user may be given the option to escalate to the payment authorization or process in response to the selection of an icon (e.g. after the user has deemed that he/she has completed the pre-transaction experience.

Figure 12:
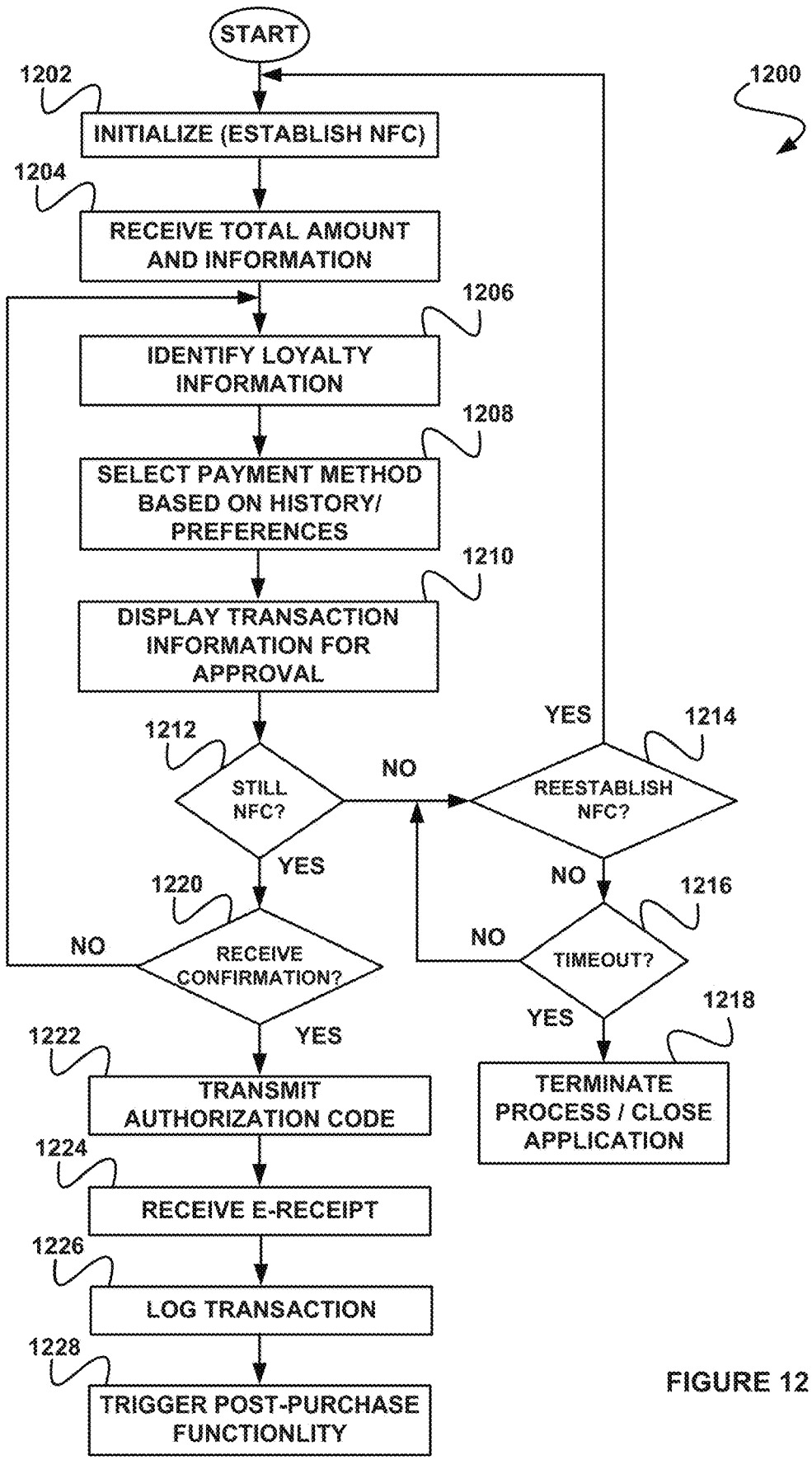
FIG. 12 shows a method for a mobile device transaction, in accordance with another embodiment.

FIG. 12 shows a method 1200 for a mobile device transaction, in accordance with another embodiment. As an option, the method 1200 may be implemented in the context of the architecture and environment of the previous Figures and/or any subsequent Figure(s). Of course, however, the method 1200 may be carried out in any desired environment. It should also be noted that the aforementioned definitions may apply during the present description.

As shown, a mobile device is initialized. See operation 1202. In one embodiment, the mobile device may be initialized based on a proximity to another device (e.g. a point-of-sale device, etc.). In another embodiment, the mobile device may be initialized based on the depression of a home key.

In another embodiment, the mobile device may be initialized upon a change from a sleep mode to a standby mode. In another embodiment, the mobile device may be initialized upon a change from a standby mode to an on mode (e.g. power up mode). In another embodiment, the mobile device may be initialized upon receiving a signal from the user.

In another embodiment, the mobile device may be initialized upon receiving a signal from an application. In another embodiment, the mobile device may be initialized upon establishment of an NFC connection (e.g. with a point-of-sale terminal, etc.). Of course, in various embodiments, the mobile device may be initialized in a variety of ways. By way of further example, initialization may be prompted with any of the aforementioned user identifying aspects described during reference to FIGS. 3-8, any of the techniques described in connection with operation 1002 of FIG. 10, and/or anything else that is capable of triggering initialization, for that matter.

Once the mobile device is initialized, information associated with the transaction, including a total amount, is received. See operation 1204. The information associated with the transaction may include any transaction related information.

Further, loyalty information is identified. See operation 1206. In one embodiment, the loyalty information may be identified automatically. In another embodiment, the loyalty information may be identified manually (e.g. upon selection of a card, etc.). Of course, the loyalty information may be identified in any desired manner (e.g. see, for example, the description of operation 1004 of FIG. 10, etc.).

Additionally, a payment method is selected based on user history or preferences. See operation 1208. For example, in one embodiment, the user may have selected a particular payment method to be a default payment method. In another embodiment, the user may have utilized a particular payment method on one or more previous occasions, such that the payment method it determined to be used based on history.

In various embodiments, the payment method may include a credit card (or a credit card number), a debit card, a prepaid card, bank account information, and/or any other payment type. In one embodiment, the payment method may be manually selected by the user at the time of completing the transaction. Further, in another embodiment, the payment method may be automatically selected (or at least suggested) based on any criteria. Such criteria may include or be based, at least in part, on a current location (e.g. based on a GPS location, etc.), a point-of-sale terminal used, on a signal received (e.g. that indicates which payment method types are acceptable), the type of payment method last used (in general, or at the current location), a balance of an account associated with the payment method (that is sufficient to cover the cost of the transaction), etc.

Still yet, transaction information is displayed for approval. See operation 1210. In one embodiment, the transaction information may be displayed on the mobile device. In another embodiment, the transaction information may be displayed on a point-of-sale terminal (in addition to or in lieu of display on the mobile device). In one embodiment, the transaction information may be displayed along with a selection option to approve and/or confirm the transaction. In another embodiment, the transaction information may be displayed along with a selection option to go back to a previous step in the transaction process (e.g. to enter loyalty information, etc.). More information regarding various optional techniques with which the transaction information may be displayed on the mobile device will be set forth hereinafter in greater detail during reference to subsequent figures.

Further, it is determined whether an NFC connection (or any session that was triggered by the initialization of operation 1202) is still available. See determination 1212. If a connection is not still available, it is determined whether a connection can be reestablished. See operation 1214. If a connection cannot be reestablished, the mobile device (or an application associated therewith) determines whether there is a timeout. See decision 1216. If it is determined that there is a timeout, the transaction process is terminated on the mobile device and the application is closed. See operation 1218.

If a connection is still available, it is determined whether purchase confirmation is received from the user. See determination 1220. In one embodiment, the purchase confirmation may include the user selecting a confirmation icon presented on the mobile device, sliding a slider, performing a predetermined gesture, entering a pass code, scanning a fingerprint/face, and/or any other desired user input. In another embodiment, the user may have an option to confirm the purchase utilizing a point-of-sale terminal associated with the transaction.

If it is determined that confirmation is received, an authorization code is transferred. See operation 1222. In one embodiment, the authorization code may be transmitted from the mobile device to the point-of-sale terminal. In another embodiment, the authorization code may be transmitted from the mobile device to a store backend server. In another embodiment, the authorization code may be transmitted from the mobile device to a payment server.

Once the transaction is complete, an electronic receipt may be received. See operation 1224. In one embodiment, the electronic receipt may be received over the connection between the point-of-sale terminal and the mobile device (e.g. the NFC connection, etc.). In another embodiment, the electronic receipt may be received via a text message (e.g. an MMS, an SMS, etc.).

In another embodiment, the electronic receipt may be received via an email. In another embodiment, the electronic receipt may be received over a network (e.g. accessed by a website, etc.). In another embodiment, the electronic receipt may be received by an application stored on the mobile device (e.g. an e-wallet application, a store application, etc.). In another embodiment, the electronic receipt may be stored on a network server (e.g. in a network cloud, etc.).

Furthermore, in one embodiment, the transaction may be logged. See operation 1226. In one embodiment, the transaction may be logged on the mobile device. In another embodiment, the transaction may be logged in a database associated with the store. In another embodiment, the transaction may be logged in a database associated with the payment facilitator. In another embodiment, the transaction may be logged in a database associated with a service provider (e.g. an advertiser, a social network, etc.).

In one embodiment, post-purchase functionality is triggered. See operation 1228. While operation 1128 is shown to occur after operation 1126, it should be noted that operation 1128 may occur immediately (or shortly) after determination 1220. For that matter, any of the operations disclosed herein (in any of the Figures) may be re-ordered as desired, as well as removed and/or subject to additional intermediate operations.

In various embodiments, the post-purchase functionality may include displaying advertisements, displaying shopping suggestions, displaying discounts, displaying options for products not purchased, displaying contact information associated with the transaction or a potential future transaction, displaying a survey and/or satisfaction related questions, and/or various other post-purchase functionality.

As an option, in one possible embodiment, any of the post-transaction experience functionality may be facilitated by way of the automatic execution of a business-specific application. In such embodiment, the business-specific application may be utilized to provide any of the post-experience functionality set forth herein. Further, such business-specific application may interface with an e-wallet application for sharing information (e.g. transaction information, purchase statistics, profile information, etc.) for providing and/or supporting the post-experience functionality.

In one embodiment, advertisers may utilize the completion of the transaction as a target advertisement trigger event. For example, in one embodiment, the owner of a presentation medium (e.g. a store, etc.) may be in communication with one or more service networks, such that advertisements may be presented at a time of sale.

Figure 13:
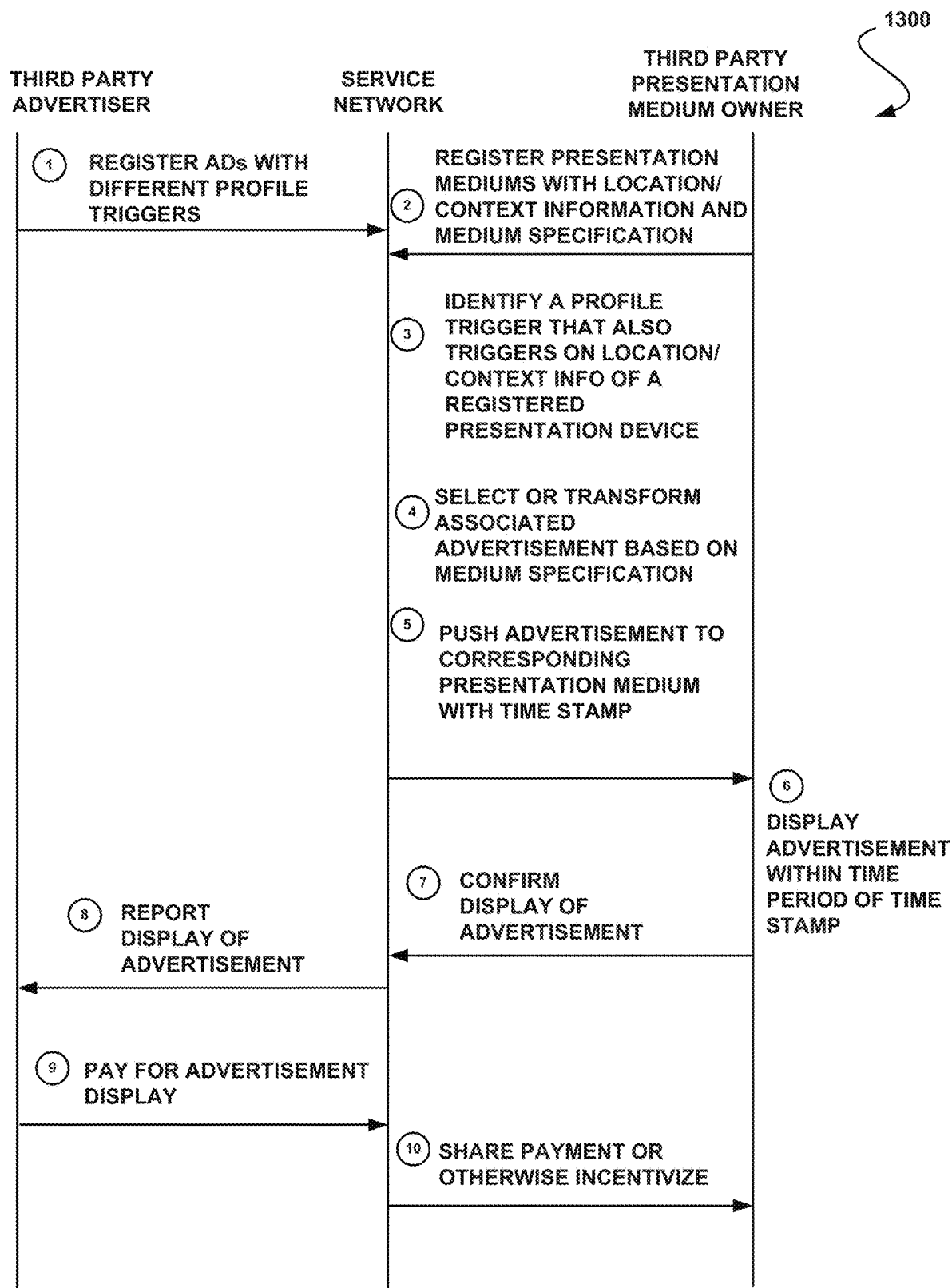
FIG. 13 shows a system flow for presenting advertisements, in accordance with another embodiment.

FIG. 13 shows a system flow 1300 for presenting advertisements, in accordance with another embodiment. As an option, the system flow 1300 may be implemented in the context of the architecture and environment of the previous Figures and/or any subsequent Figure(s). Of course, however, the system flow 1300 may be implemented in any desired environment. It should also be noted that the aforementioned definitions may apply during the present description.

As shown, a third party advertiser registers one or more advertisements, which are associated with one or more profile triggers, with a service network. See step 1. This may or may not, for example, encompass any of the trigger IDs and related information described hereinabove in connection with FIGS. 1-9, in one embodiment.

Further, a third party owner of a presentation medium registers one or more presentation mediums, including location/context information and a context medium specification, with the service network. See step 2. The location/context information may include any IP or destination address and/or any other identifier capable of being used to direct advertisements (or trigger IDs) thereto. Further, the context medium specification may identify any formatting/protocol/etc. that is capable of being used to ensure that the advertisements selected for and/or directed to the presentation medium are formatted for proper delivery and/or presentation.

The service network then identifies a profile trigger that also may trigger on location/context information of a registered presentation device. See step 3. In one embodiment, this may or may not be accomplished in a manner similar to that set forth during the description of FIGS. 1-9. For instance, a user identifying aspect may be received in connection the registered presentation device. Further, in response to such user identifying aspect, an advertisement/content may be identified by matching advertisement/content profile criteria with user profile criteria. See step 4.

Further, the service network transforms the selected advertisement, based on a medium specification. Again, see step 4.

Additionally, the service network pushes one or more advertisements to a corresponding presentation medium with a time stamp. See step 5. Subsequently, the advertisement is displayed within the time period of the time stamp. See step 6. Furthermore, in one embodiment, the service network may confirm display of the advertisement. See step 7.

Still yet, the display of the advertisement is reported to the third party advertiser. See step 8. As a result, the third party advertiser may pay for the advertisement display. See step 9. Moreover, in one embodiment, the service network may share payment with and/or otherwise incentivize the third party presentation medium owner. See step 10.

In one embodiment, the advertisement may be presented on a mobile device of the user. Further, in one embodiment, the advertisement may be presented on the mobile device screen, along with transaction details associated with a sale. Still yet, in one embodiment, the mobile device may be utilized to facilitate the transaction and/or trigger advertising events.

Figure 14:
FIG. 14 shows a mobile device interface for facilitating a payment, in accordance with another embodiment.

FIG. 14 shows a mobile device interface 1400 for facilitating a payment, in accordance with another embodiment. As an option, the system interface 1400 may be implemented in the context of the architecture and environment of the previous Figures and/or any subsequent Figure(s). Of course, however, the interface 1400 may be implemented in any desired environment. It should also be noted that the aforementioned definitions may apply during the present description.

As shown, upon initialization of a payment process, in one embodiment, transaction information may be shown on a lock screen of a mobile device screen. Further, in one embodiment, additional alerts may be capable of being displayed on the screen (e.g. text message alerts, calendar alerts, incoming call alerts, voicemail alerts, etc.).

In one embodiment, the transaction details displayed on the screen may include a total amount, a preferred or selected method of payment (e.g. the Visa Card ending in *3232, etc.), loyalty card information, and/or various other information. Further, in one embodiment, the user may be presented with an option to accept payment. In one embodiment, the option to select payment may include a button. In another embodiment, the option to select payment may include a slider. In another embodiment, the option to select the payment may include a passcode entry. In another embodiment, the option to select the payment may include a biometric data entry portion.

Figures 15, 16:
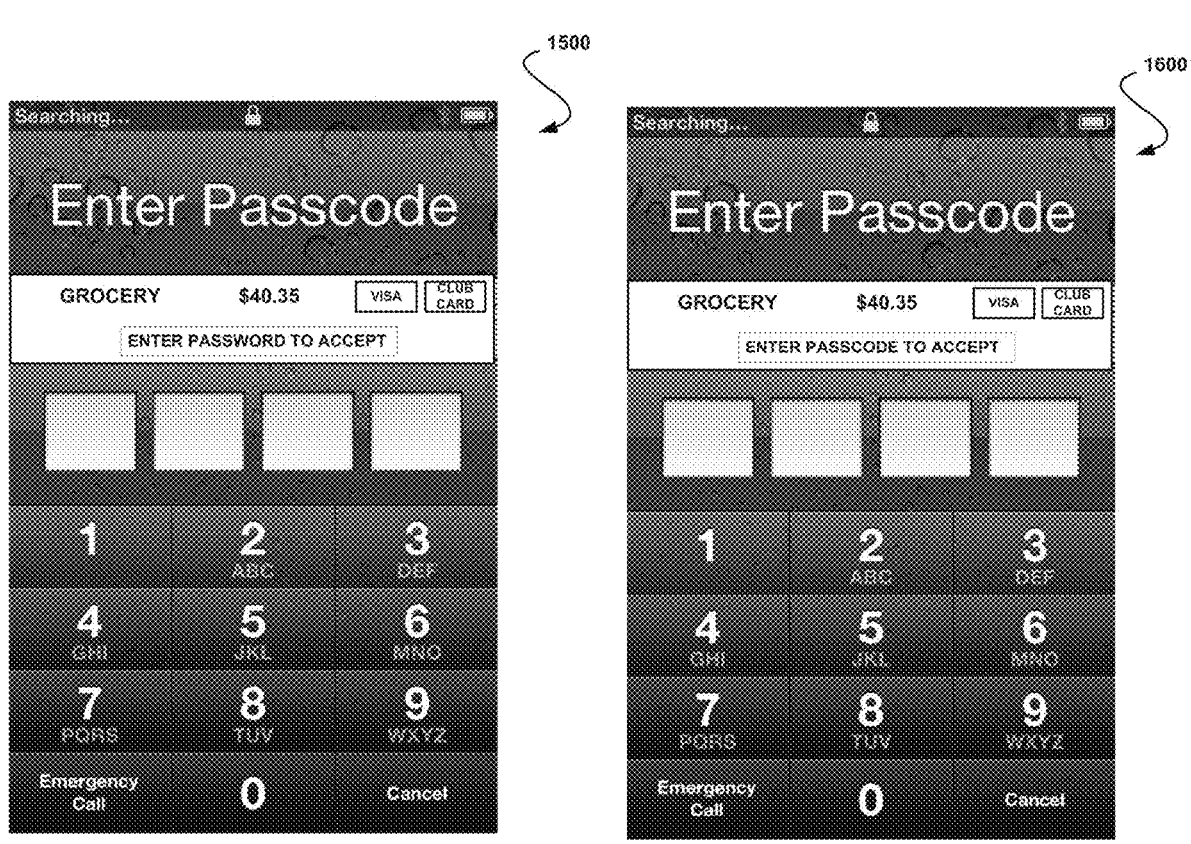
FIG. 15 shows a mobile device interface for facilitating a payment, in accordance with another embodiment.
FIG. 16 shows a mobile device interface for facilitating a payment, in accordance with another embodiment.

FIG. 15 shows a mobile device interface 1500 for facilitating a payment, in accordance with another embodiment. As an option, the system interface 1500 may be implemented in the context of the architecture and environment of the previous Figures and/or any subsequent Figure(s). Of course, however, the interface 1500 may be implemented in any desired environment. It should also be noted that the aforementioned definitions may apply during the present description.

As shown, upon initialization of a payment process, in one embodiment, transaction information may be shown on a password entry screen of a mobile device. Further, in one embodiment, additional alerts may be capable of being displayed on the screen (e.g. text message alerts, calendar alerts, incoming call alerts, voicemail alerts, etc.). In one embodiment, the user may have the ability to enter an alpha-numeric password to authorize the transaction. As an option, such alpha-numeric password may be the same or different from the alpha-numeric password used to unlock the screen lock screen (to access the menu, etc.).

FIG. 16 shows a mobile device interface 1600 for facilitating a payment, in accordance with another embodiment. As an option, the system interface 1600 may be implemented in the context of the architecture and environment of the previous Figures and/or any subsequent Figure(s). Of course, however, the interface 1600 may be implemented in any desired environment. It should also be noted that the aforementioned definitions may apply during the present description.

As shown, upon initialization of a payment process, in one embodiment, transaction information may be shown on a passcode entry screen of a mobile device. Further, in one embodiment, additional alerts may be capable of being displayed on the screen (e.g. text message alerts, calendar alerts, incoming call alerts, voicemail alerts, etc.). In one embodiment, the user may have the ability to enter a numeric passcode to authorize the transaction. In one embodiment, the numeric passcode may include the same passcode for accessing additional phone/e-mail/mobile device menu functionality.

Figure 17:
FIG. 17 shows a mobile device interface for facilitating a payment, in accordance with another embodiment.

FIG. 17 shows a mobile device interface 1700 for facilitating a payment, in accordance with another embodiment. As an option, the system interface 1700 may be implemented in the context of the architecture and environment of the previous Figures and/or any subsequent Figure(s). Of course, however, the interface 1700 may be implemented in any desired environment. It should also be noted that the aforementioned definitions may apply during the present description.

As shown, upon initialization of a payment process, in one embodiment, transaction information may be shown on a passcode entry screen of a mobile device. Further, in one embodiment, additional alerts may be capable of being displayed on the screen (e.g. text message alerts, calendar alerts, incoming call alerts, voicemail alerts, etc.). In one embodiment, the user may have the ability to present a face image to authorize the transaction. For example, in one embodiment, the user may utilize a camera of the mobile device to capture one or images of his/her face such that a facial recognition process may be utilized to determine whether to authorize the payment.

Once the payment has been confirmed, in one embodiment, post-payment functionality may be presented to the user on the mobile device.

Figure 18:
FIG. 18 shows a mobile device interface for presenting post-payment functionality, in accordance with another embodiment.

FIG. 18 shows a mobile device interface 1800 for presenting post-payment functionality, in accordance with another embodiment. As an option, the system interface

1800 may be implemented in the context of the architecture and environment of the previous Figures and/or any subsequent Figure(s). Of course, however, the interface 1800 may be implemented in any desired environment. It should also be noted that the aforementioned definitions may apply during the present description.

As shown, in one embodiment, the post-payment functionality may be presented on a lock screen associated with the mobile device. In one embodiment, the post-payment functionality may include displaying an alert or notification indicating that the payment/transaction was successful. In another embodiment, the post-payment functionality may include displaying advertisements on the mobile device screen. In one embodiment, the advertisement may be provided by the business associated with the transaction. In another embodiment, the advertisement may be provided by a service provider (e.g. a social network service, etc.). In another embodiment, the advertisement may be provided by an advertiser. Of course, the advertisement may be provided based on any of the techniques described herein (e.g. targeted based on user information, etc.). See, for example, the description of FIGS. 1-9, in accordance with one embodiment.

As an option, content/icons/options, etc. of the interfaces of FIGS. 14-18 may be displayed for facilitating the initiation and completion of an e-wallet transaction without necessarily having to manually remove the mobile device from a standby mode, and without necessarily leaving the lock-screen. Of course, in other embodiments, initiation and completion of the e-wallet transaction with manual initiation and non-lock-screen functionality is contemplated, as well.

In still other embodiments, the ability to initiate and/or complete e-wallet transactions via the lock screen (see FIGS. 14-18) may be disabled (i.e. selectively enabled) via a settings interface. When such functionality is disabled, the e-wallet transaction may be initiated and/or completed via an e-wallet application interface screen (that may be accessed via a main menu screen, etc.).

Further, in one embodiment, the user may be presented with an option to receive targeted advertisements based on purchase, at a current time and/or in the future. Additionally, in one embodiment, the user may be presented with the option to share information (e.g. transaction information, purchase information, personal information, etc.) with one or more other systems (e.g. advertisers, etc.).

As an option, the aforementioned mobile device may be capable of operating in a location-specific mode. Specifically, in one embodiment, a location associated with the mobile device may be determined. Further determined may be a presence of at least one other person at the location. Still yet, a graphical user interface may be automatically displayed. Such graphical user interface may be specifically associated with the determined location and the determined presence of the at least one other person. In another embodiment, the system, method, or computer program product may be capable of determining a location associated with the mobile device and automatically determining that the location is proximate to a previously identified item of interest. To this end, a graphical user interface associated with the determined location and the previously identified item of interest may be displayed. More information regarding such location-specific features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

In various other optional embodiments, the features, capabilities, and/or technology, etc. of the television, mobile devices, and/or mobile device applications, etc. disclosed in the following patents/applications may or may not be incorporated into any of the embodiments disclosed herein: U.S. Pat. Nos. 8,078,397, 7,669,123, 7,725,492, 7,788,260, 7,797,256, 7,809,805, 7,827,208, 7,827,265, 7,890,501, 7,933,810, 7,945,653, 7,970,657, 8,010,458, 8,027,943, 8,037,093, 8,081,817, 8,099,433, US20080033739A1, US20080046976A1, US20090144392A1, US20090198487A1, US20100049852A1, US20100132049A1, US20100164957A1, US20100169327A1, US20100198581A1, US20100229223A1, US20100257023A1, and/or US20110044354A1. Each of the foregoing patents/applications are hereby incorporated by reference in their entirety for all purposes.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

In one embodiment, each method described above and combinations thereof may be embodied in computer executable code that, when executing on one or more computing devices, performs the acts and/or provides the capabilities thereof. In another embodiment, the methods may be embodied in systems that perform the acts and/or provides the capabilities thereof, and may be distributed across devices in a number of ways, or all of the functionality may be integrated into a dedicated, standalone device or other hardware. In another embodiment, means for performing the steps associated with the processes described above may include any of the hardware and/or software described above. All such permutations and combinations are intended to fall within the scope of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An electronic device, comprising a non-transitory memory including instructions that, when executed by one or more processors of the electronic device, cause the electronic device to perform actions including:
   causing storage, by the one or more processors of the electronic device, of payment information associated with a payment account by a secure element of the electronic device;
   receiving, by the secure element of the electronic device, the payment information associated with the payment account;
   storing, by the secure element of the electronic device, the received payment information associated with the payment account securely;
   detecting, by the electronic device, a payment operation associated with an application program including a browser;
   selecting the payment account from amongst a plurality of payment accounts, wherein the payment information corresponds to the selected payment account;
   in response to the detected payment operation, presenting a stimulus indicating that an electronic device contact user input corresponding to an authorization of a payment transaction has not been locally received by the electronic device; and
   in response to a determination, by the one or more processors of the electronic device, that the electronic device contact user input corresponding to the authorization of the payment transaction has been locally received by the electronic device:
      causing retrieval, by the one or more processors of the electronic device, of the payment information associated with the payment account from the secure element of the electronic device; and
      causing releasing, by the one or more processors of the electronic device, of the payment information for the payment operation associated with the application program including the browser.

2. The electronic device of claim 1, wherein the electronic device is configured such that a detection of the electronic device contact user input comprises detecting whether a physical button on the electronic device has been pressed.

3. The electronic device of claim 1, wherein the electronic device is configured such that the securely storing, by the electronic device, the payment information, includes storing a security token.

4. The electronic device of claim 1, wherein the electronic device is configured such that the securely storing, by the electronic device, the payment information, includes storing an encrypted version of the payment information.

5. The electronic device of claim 1, wherein the electronic device is configured such that the detected payment operation is conditioned upon a presence of an item in a digital shopping cart of a web page accessible via the browser.

6. The electronic device of claim 1, wherein the electronic device is configured such that the detected payment operation includes a press of a virtual button on a touchscreen of the electronic device, and no other contact user input into the electronic device is required to be detected between a detection of the press of the virtual button and the release of the payment information, other than the electronic device contact user input that includes a press of another virtual button that is detected by the electronic device.

7. The electronic device of claim 1, wherein the electronic device is configured such that:
   detecting whether the electronic device contact user input corresponding to the authorization of the payment transaction has been locally received by the electronic device comprises detecting whether a physical button on the electronic device has been pressed twice;
   the application program includes a web browser for browsing web pages on the Internet;
   the detected payment operation is in connection with an item in a digital shopping cart; and
   transaction information is communicated from the electronic device to a server over the Internet, without using a point-of-sale terminal.

8. The electronic device of claim 7, wherein the electronic device is configured such that, when the electronic device contact user input corresponding to the authorization of the payment transaction has been locally received by the electronic device, an option is presented for opening a particular interface.

9. The electronic device of claim 7, wherein the electronic device is configured such that the selecting the payment account is after the detected payment operation and in response to and based on detecting additional user input.

10. The electronic device of claim 1, wherein the electronic device is configured such that, after detecting that the electronic device contact user input has been locally received by the electronic device, the electronic device is configured for:
    presenting a representation of a default payment account;
    determining that an account-modification input has been received that corresponds to an identification of another payment account;
    selecting the payment account from amongst a plurality of payment accounts, wherein the selected payment account includes the default payment account when the account-modification input has not been received, and wherein the selected payment account includes the another payment account when the account-modification input has been received.

11. A computer-implemented method comprising:
    at an electronic device including a non-transitory memory, one or more processors, and a secure element:
       causing storage, by the one or more processors of the electronic device, of payment information associated with a payment account by the secure element of the electronic device;
       receiving, by the secure element of the electronic device, the payment information associated with the payment account;

storing, by the secure element of the electronic device, the received payment information associated with the payment account securely;

detecting, by the electronic device, a payment operation associated with an application program including a browser;

in response to the detected payment operation, presenting a stimulus indicating that an electronic device contact user input corresponding to an authorization of a payment transaction has not been received;

detecting, subsequent to the stimulus presentation, an electronic device contact user authorization input, the electronic device contact user authorization input corresponding to the authorization of the payment transaction;

presenting a representation of a default payment account;

determining whether an account-modification input has been received that corresponds to an identification of another payment account;

selecting the payment account from amongst a plurality of payment accounts, wherein the payment information corresponds to the selected payment account, wherein the selected payment account includes the default payment account when the account-modification input has not been received that corresponds to the identification of the another payment account, and wherein the selected payment account includes the another payment account when the account-modification input has been received that corresponds to the identification of the another payment account;

in response to detecting the electronic device contact user authorization input, causing retrieval, by the one or more processors of the electronic device, of the payment information associated with the payment account from the secure element of the electronic device; and causing releasing, by the one or more processors of the electronic device, of the payment information for the payment operation associated with the application program including the browser.

12. The method of claim 11, wherein detecting the electronic device contact user authorization input comprises detecting that a physical button on the electronic device has been pressed.

13. The method of claim 11, wherein the presentation of the representation, the determining, and the selection, are performed after detecting that the electronic device contact user authorization input.

14. The method of claim 11, wherein:
the detecting the electronic device contact user authorization input comprises detecting whether a physical button on the electronic device has been pressed twice;
the detected payment operation is in connection with an item in a digital shopping cart;
the payment information is retrieved and is released, in response to the detection of the electronic device contact user authentication input; and
transaction information is communicated from the electronic device to a server over the Internet, such that the payment operation is completely performed without using a point-of-sale terminal.

15. The method of claim 14, wherein the selecting the payment account occurs after the detected payment operation, and in response to additional user input that is detected prior to detection of the electronic device contact user input.

16. The method of claim 13, wherein:
the detected payment operation is in connection with an item in a digital shopping cart of a web page, and the electronic device contact user input comprises a physical button on the electronic device being pressed twice; and
the payment information is retrieved and is released, in response to the detection of the electronic device contact user authorization input after the stimulus is presented, where the secure element further stores a particular number that is unique to the electronic device and that is not a card number of a physical card associated with the payment account, such that the payment operation is completed by communicating the particular number without using a point-of-sale terminal.

17. The method of claim 11, wherein:
the detected payment operation is in connection with an item in a digital shopping cart of a web page, and the electronic device contact user input comprises a physical button on the electronic device being pressed;
the payment information is retrieved and is released, in response to the detection of the electronic device contact user authorization input after the stimulus is presented, where the secure element further stores a particular number that is unique to the electronic device, such that the payment information includes the particular number and a code, and does not include a credit card number of a card associated with the payment account; and
the detected payment operation includes a press of a virtual button on a touchscreen of the electronic device, and no other contact user contact input into the electronic device is required to be detected between a detection of the press of the virtual button and the release of the payment information, other than the electronic device contact user input.

18. The method of claim 13, wherein:
the detected payment operation is in connection with an item in a digital shopping cart of a web page, and the electronic device contact user input comprises contacting a virtual button displayed on a touchscreen of the electronic device; and
the payment information is retrieved and is released, in response to the detection of the electronic device contact user authorization input after the stimulus is presented, where the secure element further stores a particular number that is unique to the electronic device and that is not a card number of a physical card associated with the payment account, such that the payment operation is completed by communicating the particular number without using a point-of-sale terminal.

19. The method of claim 11, wherein:
the detected payment operation is in connection with an item in a digital shopping cart of a web page, and the electronic device contact user input comprises contacting a virtual button displayed on a touchscreen of the electronic device;
the payment information is retrieved and is released, in response to the detection of the electronic device contact user authorization input after the stimulus is presented, where the secure element further stores a particular number that is unique to the electronic device, such that the payment information includes the particular number and a code, and does not include a credit card number of a card associated with the payment account;

the detected payment operation includes a press of a virtual button on a touchscreen of the electronic device, and no other contact user contact input into the electronic device is required to be detected between a detection of the press of the virtual button and the release of the payment information, other than the electronic device contact user input; and shared information is shared with a business associated with the payment operation, to cause display of a suggestion associated with the business; where the shared information includes at least two of: transaction location information, loyalty information, and method of purchase information.

20. The electronic device of claim 1, wherein the electronic device is configured such that:

the detected payment operation is in connection with an item in a digital shopping cart of a web page, and the electronic device contact user input comprises a physical button on the electronic device being pressed twice; and the secure element further stores a particular number that is unique to the electronic device and that is not a card number of a physical card associated with the payment account, such that the payment operation is completed by communicating the particular number without using a point-of-sale terminal.

21. The electronic device of claim 1, wherein the electronic device is configured such that:

the detected payment operation is in connection with an item in a digital shopping cart of a web page, and the electronic device contact user input comprises a physical button on the electronic device being pressed twice;

the secure element further stores a particular number that is unique to the electronic device, such that the payment information includes the particular number and a code, and does not include a credit card number of a card associated with the payment account; and the detected payment operation includes a press of a virtual button on a touchscreen of the electronic device, and no other contact user input into the electronic device is required to be detected between a detection of the press of the virtual button and the release of the payment information, other than the electronic device contact user input.

22. The electronic device of claim 1, wherein the electronic device is configured such that:

the detected payment operation is in connection with an item in a digital shopping cart of a web page, and the electronic device contact user input comprises contacting a virtual button displayed on a touchscreen of the electronic device;

the secure element further stores a particular number that is unique to the electronic device and that is not a card number of a physical card associated with the payment account, such that the payment operation is completed by communicating the particular number without using a point-of-sale terminal; and shared information is automatically shared with a business associated with the payment operation, for displaying reward offers from the business via an interface that is specific to only the business and not other businesses.

23. The electronic device of claim 1, wherein the electronic device is configured such that:

the detected payment operation is in connection with an item in a digital shopping cart of a web page, and the electronic device contact user input comprises contacting a virtual button displayed on a touchscreen of the electronic device;

the secure element further stores a particular number that is unique to the electronic device, such that the payment information includes the particular number and a code, and does not include a credit card number of a card associated with the payment account; and the detected payment operation includes a press of a virtual button on a touchscreen of the electronic device, and no other contact user input into the electronic device is required to be detected between a detection of the press of the virtual button and the release of the payment information, other than the electronic device contact user input.

24. The electronic device of claim 23, wherein the electronic device is configured such that shared information is automatically shared with a business associated with the payment operation, resulting in the business being capable of causing display of one or more offers based on the shared information, the shared information includes: information associated with different transactions, transaction location information, loyalty information, and method of purchase information.

25. The electronic device of claim 23, wherein the electronic device is configured such that at least a portion of the instructions are part of a payment application that supports: transactions with and without a near field communication-equipped point-of-sale terminal, display of offers by businesses based on shared information shared based on the transactions, and search capabilities in connection with the transactions; where the shared information includes at least two of: information associated with different transactions, transaction location information, loyalty information, and method of purchase information.

26. The electronic device of claim 1, wherein the electronic device is configured such that shared information is automatically shared with a business associated with the payment operation, resulting in the business being capable of causing display of one or more offers based on the shared information, the shared information includes: information associated with different transactions, transaction location information, loyalty information, and method of purchase information.

27. The electronic device of claim 1, wherein the electronic device is configured such that at least a portion of the instructions are part of a payment application that supports: transactions with and without a near field communication-equipped point-of-sale terminal, display of offers by businesses based on shared information shared based on the transactions, and search capabilities in connection with the transactions; where the shared information includes at least two of: information associated with different transactions, transaction location information, loyalty information, and method of purchase information.

28. The electronic device of claim 1, wherein the electronic device is configured such that shared information is automatically shared with a business associated with the payment operation, for displaying reward offers from the business via an interface that is specific to only the business and not other businesses.

29. The electronic device of claim 1, wherein the electronic device is configured such that:
the detected payment operation is in connection with an item in a digital shopping cart of a web page, and the electronic device contact user input comprises contacting a virtual button displayed on a touchscreen of the electronic device;
the secure element further stores a particular number that is unique to the electronic device, such that the payment information includes the particular number and a code, and does not include a credit card number of a card associated with the payment account; and
the detected payment operation includes a press of a virtual button on a touchscreen of the electronic device, and no other contact user input into the electronic device is required to be detected between a detection of the press of the virtual button and the release of the payment information, other than the electronic device contact user input that includes user authentication input.

30. The electronic device of claim 23, wherein the electronic device is configured such that at least one of:
the payment information includes data that includes or is based, at least in part, on at least one of: a username, a password, a name, an alias, a user identifier, a user email address, a physical address, a user phone number, an application identifier, a user context identifier, a cookie, a session identifier, a purchase receipt, an account number, an account alias, a randomly generated identifier, a comment, content, a facial recognition result, a fingerprint scan result, an Internet search query, a photo, a scan of a code, a location, a status, a signal, a transaction, or a unique identifier;
the payment information includes a user identifying aspect;
the payment information is user identifying;
the payment information is securely stored by being encrypted;
the payment information is securely stored by being encrypted when the payment is received;
the payment information is securely stored by being encrypted after the payment is received;
the payment information is securely stored by being stored by the secure element;
the secure element includes memory;
the secure element includes random access memory;
the secure element includes read only memory;
the secure element includes only random access memory;
the secure element includes only read only memory;
the secure element includes random access memory and read only memory;
the secure element is part of the non-transitory memory;
the secure element is not part of the non-transitory memory;
the non-transitory memory includes random access memory;
the non-transitory memory includes read only memory;
the non-transitory memory includes only random access memory;
the non-transitory memory includes only read only memory;
the non-transitory memory includes random access memory and read only memory;
the secure element stores the payment information in an encrypted form;
the secure element stores the payment information in an encrypted form for ensuring user anonymity;
the secure element is secure by being capable of storing the payment information in an encrypted form;
the payment information includes a credit card number;
the payment information does not include a credit card number;
the payment information is retrieved in an encrypted form;
the payment information includes the particular number;
the particular number is unique to the electronic device by being specific to the electronic device;
the particular number is unique to the electronic device by being a cell number of the electronic device;
the particular number includes an electronic device number;
the particular number includes a cell number;
the particular number includes a code;
the electronic device contact user input includes user input that contacts the electronic device;
the electronic device contact user input includes user input that contacts a touchscreen of the electronic device;
the electronic device contact user input includes user input that contacts a push button of the electronic device;
the securely storing the payment information includes storing an encrypted version of the payment information, and wherein the payment information is accessed by decrypting the encrypted version of the payment information;
the selection occurs prior to the detection of the payment operation;
the selection occurs after the detection of the payment operation;
the selection is automatic;
the selection is automatic in response to user input;
the selection is performed by the electronic device in response to user input;
the application program includes a commerce application;
the payment operation includes a payment;
the payment operation includes a payment attempt;
the payment operation includes a checkout;
the payment operation is sourced from an operating system;
the payment operation is not sourced from an operating system;
the payment operation is sourced utilizing an operating system;
the payment operation is not sourced utilizing an operating system;
the payment operation is stored utilizing an operating system;
the payment operation is not stored utilizing an operating system;
the payment operation is stored in an operating system;
the payment operation is not stored in an operating system;
the payment operation includes an initiation of a payment;
the payment operation includes a continuation of a payment;
the payment operation includes an initiation of a checkout;
the payment operation includes a continuation of a checkout;
the payment operation includes a response to a user input that initiates a payment;
the payment operation includes a response to a payment-related user input;

the determination, by the one or more processors, that the electronic device contact user input corresponding to the authorization of the payment transaction has not been locally received, includes not detecting the electronic device contact user input corresponding to the authorization of the payment transaction;

the determination, by the one or more processors, that the electronic device contact user input corresponding to the authorization of the payment transaction has been locally received, includes detecting the electronic device contact user input corresponding to the authorization of the payment transaction;

the determination, by the one or more processors, that the electronic device contact user input corresponding to the authorization of the payment transaction has not been locally received, includes not receiving an indication of a detection that the electronic device contact user input corresponding to the authorization of the payment transaction has been received;

the determination, by the one or more processors, that the electronic device contact user input corresponding to the authorization of the payment transaction has been locally received, includes detecting the electronic device contact user input corresponding to the authorization of the payment transaction receiving an indication of a detection that the electronic device contact user input corresponding to the authorization of the payment transaction has been received;

the determination, by the one or more processors, that the electronic device contact user input corresponding to the authorization of the payment transaction has not been locally received, includes not receiving an indication that the electronic device contact user input corresponding to the authorization of the payment transaction has been detected;

the determination, by the one or more processors, that the electronic device contact user input corresponding to the authorization of the payment transaction has been locally received, includes detecting the electronic device contact user input corresponding to the authorization of the payment transaction receiving an indication that the electronic device contact user input corresponding to the authorization of the payment transaction has been detected;

the determination, by the one or more processors, that the electronic device contact user input corresponding to the authorization of the payment transaction has not been locally received, includes not receiving a signal of a detection that the electronic device contact user input corresponding to the authorization of the payment transaction has been received;

the determination, by the one or more processors, that the electronic device contact user input corresponding to the authorization of the payment transaction has been locally received, includes detecting the electronic device contact user input corresponding to the authorization of the payment transaction receiving a signal of a detection that the electronic device contact user input corresponding to the authorization of the payment transaction has been received;

the presentation of the stimulus indicating that the electronic device contact user input has not been locally received, is a subsequent instance of the presentation of the stimulus indicating that the electronic device contact user input has not been locally received;

the presentation of the stimulus indicating that the electronic device contact user input has not been locally received, is a repeated instance of the presentation of the stimulus indicating that the electronic device contact user input has not been locally received;

the stimulus indicates that the electronic device contact user input has not been locally received, by prompting a user to input the electronic device contact user input;

the stimulus indicates that the electronic device contact user input has not been locally received, by requesting input of the electronic device contact user input;

the stimulus indicates that the electronic device contact user input has not been locally received, by requesting receipt of the electronic device contact user input;

the presented stimulus is presented by being displayed;

the presented stimulus includes presented indicia;

the payment information is associated with the payment account, by describing at least one aspect of the payment account;

the payment information is associated with the payment account, by being derived from at least one aspect of the payment account;

the payment information is associated with the payment account, by corresponding to the payment account;

the payment operation is associated with the application program, by the application program detecting the payment operation;

the payment operation is associated with the application program, by the application program only detecting the payment operation;

the payment operation is associated with the application program, by the application program causing the payment operation;

the payment operation is associated with the application program, by the application program initiating the payment operation;

the payment operation is associated with the application program, by the application program administering the payment operation;

the locally received is local by virtue of being received by the one or more processors; or the locally received is local by virtue of being received by the electronic device including the one or more processors;

at least one of the causing storage, causing retrieval, or causing releasing, includes sending a signal, by the one or more processors, for causing performance of at least one of the storage, the retrieval, or the releasing;

at least one of the causing storage, causing retrieval, or causing releasing, includes sending a signal, from the one or more processors, for causing performance of at least one of the storage, the retrieval, or the releasing;

at least one of the causing storage, causing retrieval, or causing releasing, includes sending a signal, by or from the one or more processors, for causing performance of at least one intermediate operation that in turn causes at least one of the storage, the retrieval, or the releasing;

at least one of the causing storage, causing retrieval, or causing releasing, includes sending a signal, by or from the one or more processors, for directly causing performance of at least one of the storage, the retrieval, or the releasing, without any intermediate operation;

at least one of the causing storage, causing retrieval, or causing releasing, includes sending a signal, by or from the one or more processors, for directly causing performance of at least one of the storage, the retrieval, or the releasing;

the causing releasing of the payment information for the payment operation associated with the application program including the browser, is performed by releasing the payment information to software or hardware for use by the application program including the browser; or the causing releasing of the payment information for the payment operation associated with the application program including the browser, is performed by releasing the payment information to the application program including the browser; and wherein the actions further include determining a location associated with the electronic device; determining a presence of at least one other person at the location; and automatically displaying a graphical user interface associated with the determined location and the determined presence of the at least one other person, wherein the electronic device is further configured for determining that the location is proximate to a previously identified item of interest; and displaying another graphical user interface associated with the determined location and the previously identified item of interest.

\* \* \* \* \*